(12) United States Patent
Brinks et al.

(10) Patent No.: US 8,601,288 B2
(45) Date of Patent: Dec. 3, 2013

(54) INTELLIGENT POWER CONTROLLER

(75) Inventors: Ray Brinks, San Jose, CA (US); Benoit de Lescure, La Colle-sur-Loup (FR)

(73) Assignee: Sonics, Inc., Milpitas, CA (US)

( * ) Notice: Subject to any disclaimer, the term of this patent is extended or adjusted under 35 U.S.C. 154(b) by 276 days.

(21) Appl. No.: 12/873,013

(22) Filed: Aug. 31, 2010

(65) Prior Publication Data

US 2012/0054511 A1 Mar. 1, 2012

(51) Int. Cl.
*G06F 1/00* (2006.01)

(52) U.S. Cl.
USPC ............ 713/300; 713/322; 713/324; 365/202

(58) Field of Classification Search
USPC .......................... 713/300, 322, 324; 365/202
See application file for complete search history.

(56) References Cited

U.S. PATENT DOCUMENTS

| | | | |
|---|---|---|---|
| 5,948,089 A | 9/1999 | Wingard et al. | |
| 6,182,183 B1 | 1/2001 | Wingard et al. | |
| 6,330,225 B1 | 12/2001 | Weber et al. | |
| 6,578,117 B2 | 6/2003 | Weber | |
| 6,725,313 B1 | 4/2004 | Wingard et al. | |
| 7,051,306 B2 | 5/2006 | Hoberman et al. | |
| 7,120,712 B2 | 10/2006 | Wingard et al. | |
| 7,325,050 B2 | 1/2008 | O'Connor et al. | |
| 7,325,221 B1 | 1/2008 | Wingard | |
| 7,415,680 B2 | 8/2008 | Hoberman et al. | |
| 7,644,293 B2 | 1/2010 | Sistla et al. | |
| 7,761,696 B1 | 7/2010 | Bhattacharyya et al. | |
| 7,844,840 B2 * | 11/2010 | McShane et al. | 713/300 |
| 8,190,804 B1 * | 5/2012 | Srinivasan et al. | 710/244 |
| 2002/0129173 A1 | 9/2002 | Weber et al. | |
| 2003/0004699 A1 | 1/2003 | Choi et al. | |
| 2003/0074520 A1 | 4/2003 | Weber et al. | |
| 2004/0177186 A1 | 9/2004 | Wingard et al. | |
| 2005/0010890 A1 * | 1/2005 | Nehmadi et al. | 716/19 |
| 2005/0276132 A1 | 12/2005 | Severson et al. | |
| 2007/0094429 A1 | 4/2007 | Wingard et al. | |
| 2007/0198756 A1 | 8/2007 | Norgaard | |
| 2008/0136641 A1 | 6/2008 | Kean | |

(Continued)

FOREIGN PATENT DOCUMENTS

WO   WO 2012/030787 A2   3/2012
WO   WO 2013/043324 A1   3/2013

OTHER PUBLICATIONS

International Search Report and Written Opinion for International PCT Patent Application No. PCT/US11/049673 dated Jan. 18, 2012, 11 pages.

(Continued)

*Primary Examiner* — Brian Misiura
(74) *Attorney, Agent, or Firm* — Rutan & Tucker, LLP

(57) ABSTRACT

A method, apparatus, and system in which an interconnect for an integrated circuit communicates transactions between one or more initiator Intellectual Property (IP) cores and one or more target IP cores coupled to the interconnect, including a power manager having a hierarchy of two or more layers including a hardware logic portion to control a power consumption of two or more domains in the integrated circuit, where each layer of the power manager performs its own function; wherein the power manager has its own dedicated CPU or dedicated state machine to execute power management instructions; and wherein the power manager controls the power consumption of two or more domains without using a CPU IP core utilized by other IP cores on the integrated circuit to execute power management instructions.

21 Claims, 14 Drawing Sheets

(56) References Cited

U.S. PATENT DOCUMENTS

| | | | |
|---|---|---|---|
| 2008/0301708 | A1 | 12/2008 | Hamilton |
| 2008/0307238 | A1* | 12/2008 | Bieswanger et al. ......... 713/300 |
| 2008/0320476 | A1 | 12/2008 | Wingard et al. |
| 2009/0152948 | A1 | 6/2009 | Hoberman et al. |
| 2009/0254525 | A1 | 10/2009 | Srinivasan et al. |
| 2009/0293061 | A1 | 11/2009 | Schwinn et al. |
| 2010/0174923 | A1 | 7/2010 | Houlihan et al. |
| 2010/0318822 | A1 | 12/2010 | Scandurra et al. |
| 2012/0036509 | A1* | 2/2012 | Srinivasan et al. ............ 718/102 |
| 2012/0117301 | A1* | 5/2012 | Wingard ........................ 711/6 |

OTHER PUBLICATIONS

Wingard, D., "Socket-Based Design Using Decoupled Interconnects," *Interconnect-Centric Design for Advanced SOC and NOC,* Chapter 14, (2002) 25 pages.

Weber, Wolf-Dietrich, "Efficient Shared DRAM Subsystems for SOC's", Sonics, Inc., (2001) 6 pages.

OCP (Open Core Protocol) Specification, Release 2.0, OCP International Partnership, (2003) OCP-IP Association, pp. 210 total.

Wingard, Drew, "A Non-Blocking Intelligent Interconnect for AMBA-Connected SoCs," Sonics, Inc., Co-Ware Arm Developer's Conference, (Oct. 2005) 39 pages.

Weber, Wolf-Dietrich et al., "A Quality-of-Service Mechanism for Interconnection Networks in System-on-Chips," 1530-1591/05, (2005) IEEE, 6 pages.

Wingard, Drew Titles: The Heterogeneous Processing Abstraction for MPS0C, Jul. 2004, pp. 1-35.

Wingard, Drew, "Sonics SOC Integration Architecture," Sonics, Inc., 1999, 25 pages.

Kamas, Alan, "An Overview of the SystemC Models for the Open Core Protocol," 2004, 30 pages.

IEM Technology Overview, ARM Intelligent Energy Manager (IEM) Technology, 2008, 2 pages.

Mazzoni, Luca, "Power Aware Design," IEE Electronics Systems and Software, Oct./Nov. 2003, 6 pages.

"A Configuable Multi-standard Video Decoding Subsystem for Low-power, Low-cost Application," the ARC Subsystem, Nov. 2005, 8 pages.

White Paper for "eXtreme Energy Conservation: Advanced Power-Saving Software for Wireless Devices," Freescale Semiconductor, Rev. #0, Feb. 2006, 16 pages.

White Paper for "Technologies for Optimized Power Management," Freescale Semiconductor, Ref. #0, Feb. 2006, 10 pages.

Flautner, K., et al., "Vertigo: Automatic Performance-Setting for Linux," IEMSoftware Paper OSDI, 2002, 12 pages.

ARM Flyer, National Semiconductor, 2002, 4 pages.

Flautner, K., et al., "A Combined Hardware-Software Approach for Low-Power Socs: Applying Adaptive Voltage Scaling and Intelligent Energy Management Software," DesignCon 2003, National Semiconductor Corp., 17 pages.

IEM Flyer, National Semiconductor Corp., Feb. 2006, 2 pages.

Zarr, Richard, "PowerWise Solutions and the Future of Energy Utilization," National Semiconductor, Sep. 2007, 3 pages.

Carlson, Brian, SmartReflex Power and Performance Management, White Paper, 2005, 8 pages.

Wu, Qiang, et al., Formal Online Methods for Voltage Frequency Control in Multiple Clock Domain Microprocessors, ASPLOS, Oct. 2004, 12 pages.

Merkel, Andreas, et al, "Balancing Power Consumption in Multiprocessor Systems," EuroSys, 2006, 12 pages.

Juang, Philo, et al., "Coordinated, Distributed, Formal Energy Management of Chip Multiprocessors," ISLPED '05, Aug. 2005, 4 pages.

ISCI, Canturk, et al., "An Analysis of Efficient Multi-Core Global Power Management Policies: Maximizing Performance for a Given Power Budget," IBM Research, 2006, 12 pages.

Yonker, Mike, White Paper for "How Mobile Operators Can Monetize 3G Investments Through an Effective Applications Platform," Texas Instruments, 2006, 10 pages.

Notification of Transmittal of the International Search Report and the Written Opinion of the International Searching Authority dated Nov. 6, 2012 for International Patent Application No. PCT/US2012/052661, International Filing Date Aug. 28, 2012, 11 pages, International Searching Authority/U.S., Alexandria, Virginia USA.

Bainbridge, John, "A Secret Weapon", Nov. 17, 2011 jbainbridge Comments as featured in: sonicsinc.com/blog. Downloaded from http://www.sonicsinc.com/blog/?tag=axi, 2 pages.

\* cited by examiner

INTELLIGENT POWER CONTROLLER

NOTICE OF COPYRIGHT

A portion of the disclosure of this patent document contains material that is subject to copyright protection. The copyright owner has no objection to the facsimile reproduction by anyone of the software engine and its modules, as it appears in the Patent and Trademark Office Patent file or records, but otherwise reserves all copyright rights whatsoever.

FIELD OF THE INVENTION

Embodiments of the invention generally relate to controlling power consumption of electrical systems. More particularly, an aspect of an embodiment of the invention relates to an intelligent power controller for a complex electrical system, including System on a Chip, through power and clock distributions.

BACKGROUND OF THE INVENTION

Power dissipation in complex electrical systems diminishes the usable life of portable electronics, and increases costs. Specifically, power dissipation in complex System on a Chip (SOC) due to sub-threshold leakage is exponentially growing as the transistor channel length is reduced. Such power dissipation has commercial effects on the power consumption in mobile devices, which determines the useable life of a device based on battery capacity. Commercial effects are also seen in devices connected to an electrical outlet, as the electrical consumption of various devices increases the electrical load and cost.

SUMMARY OF THE INVENTION

An exemplary interconnect is described for complex electrical systems, including integrated circuits, to communicate transactions between one or more initiator Intellectual Property (IP) cores and one or more target IP cores coupled to the interconnect. A power manager may be used having a hierarchy of two or more layers including a hardware logic portion to control a power consumption of two or more domains in the integrated circuit, where each layer of the power manager performs its own function. The power manager controls the power consumption of two or more domains and operates transparently to the Operating System of the integrated circuit (or to a CPU IP core utilized by other IP cores) in order to transition components in the power domains into a first power consuming mode and back out of the power consuming mode into a second power consuming mode.

According to embodiments, a low-power device may be implemented relying on both low-power capable hardware, and on some "intelligence" to drive it. This "intelligence" may be distributed between hardware and/or software.

BRIEF DESCRIPTION OF THE DRAWINGS

The drawings refer to embodiments of the invention in which.

Figure 1:
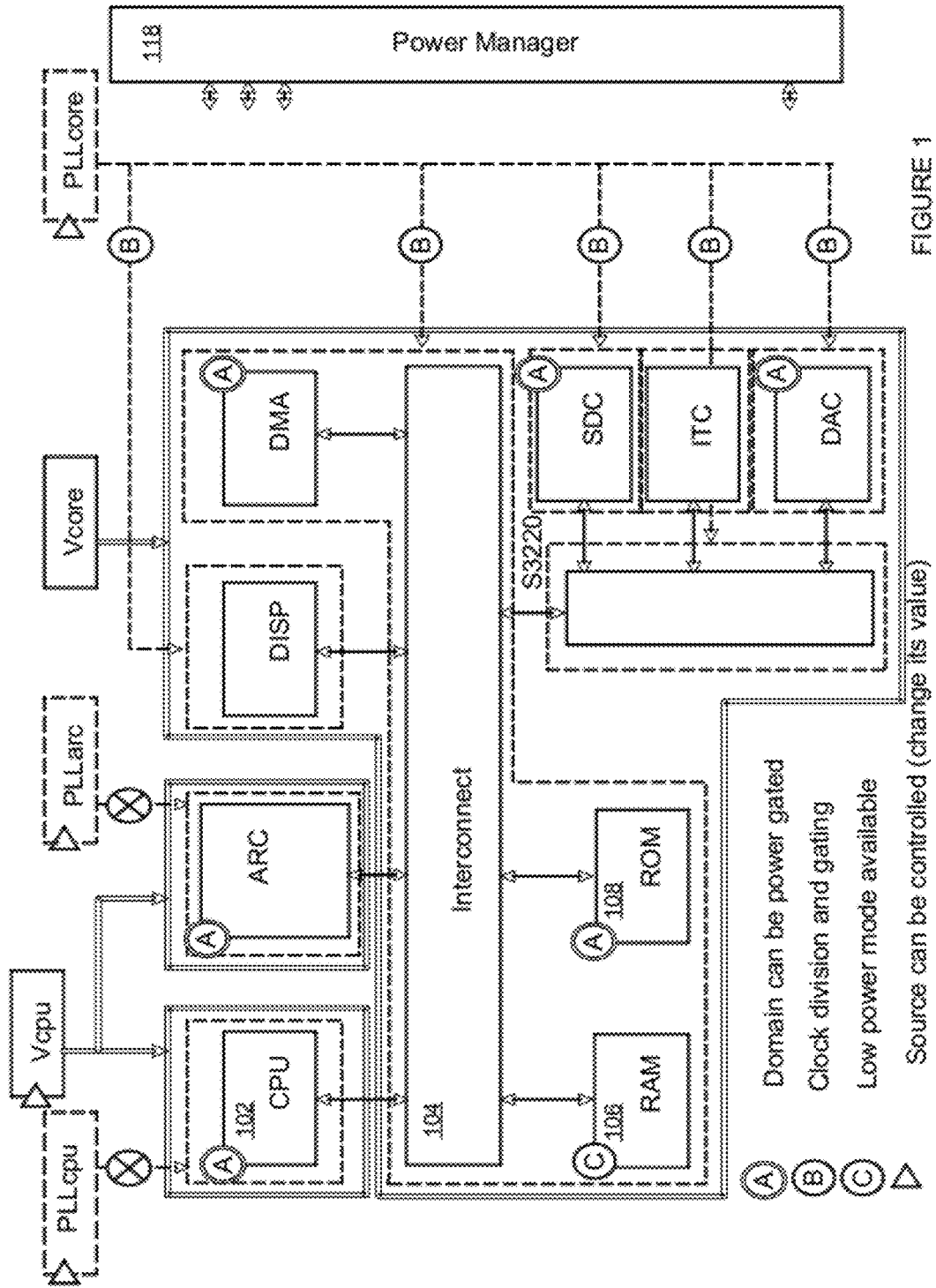
FIG. 1 illustrates a block diagram of an embodiment of a SOC having multiple initiator IP cores and multiple target IP cores that communicate read and write requests, as well as responses to those requests over an interconnect.

While the invention is subject to various modifications and alternative forms, specific embodiments thereof have been shown by way of example in the drawings and will herein be described in detail. The invention should be understood to not be limited to the particular forms disclosed, but on the contrary, the intention is to cover all modifications, equivalents, and alternatives falling within the spirit and scope of the invention.

DETAILED DISCUSSION

In the following description, numerous specific details are set forth, such as examples of specific data signals, named components, connections, number of intellectual property cores, etc., in order to provide a thorough understanding of the present invention. It will be apparent, however, to one of ordinary skill in the art that the present invention may be practiced without these specific details. In other instances, well known components or methods have not been described in detail but rather in a block diagram in order to avoid unnecessarily obscuring the present invention. Further, specific numeric references such as first driver, may be made. However, the specific numeric reference should not be interpreted as a literal sequential order but rather interpreted that the first driver is different than a second driver. Thus, the specific details set forth are merely exemplary. The specific details may be varied from and still be contemplated to be within the spirit and scope of the present invention. The term coupled is defined as meaning connected either directly to the component or indirectly to the component through another component. Coupling is also understood to be through hardware or software.

In general, the interconnect for an integrated circuit is used to communicate transactions between one or more initiator Intellectual Property (IP) cores and one or more target IP cores coupled to the interconnect. The interconnect may communicate with a power manager having a hierarchy of two or more layers including a hardware logic portion to control a power consumption of two or more domains in the integrated circuit. Each layer of the power manager performs its own function. The power manager controls the power consumption of two or more domains and may reside underneath the Operation System of the integrated circuit in order to transition components in the power domains into a first power consuming mode and back out of the power consuming mode into a second power consuming mode. Accordingly, the power manager may have its own dedicated CPU or dedicated state machine to execute power management instructions so that the power manager may control the power consumption of two or more domains without using a CPU IP core utilized by other IP cores on the integrated circuit to execute power management instructions. For example, the power manager may control the power consumption of two or more domains without the Operating System of the integrated circuit being utilized to transition components in the power domains into a first power consuming mode and back out of the power consuming mode into a second power consuming mode. The power manager may further include techniques to control power management entities that have a dynamic and controllable effect, including clock gating, power gating, dynamic voltage and dynamic frequency scaling.

The power manager is "intelligent" in that it can take decisions without external software support; and at the same time is preferably programmable, so its behavior can be changed at run-time to supports different chip operating modes. The power manager provides easy to implement policies because the policy matrix of which components can be turned off during different chip modes and applications running on the SOC may be stored in a table or register that can be easily updated even after the device has been put into operation. Accordingly, the power management policies can be programmed into a policy matrix at design time, run time, or even after fabrication during device operation.

Most aspects of the invention may be applied in most complex electrical systems and networking environments. Accordingly, an example integrated circuit such as a System on a Chip (SOC) environment will be used to flush out these aspects of the invention. Moreover, the exemplary SOC is described with an Operating System in which embodiments of the power manager operate underneath or separate from the Operating System of the SOC. However, embodiments of the power manager may be similarly applicable to SOC without an Operating System. Accordingly, embodiments of the power manager may operate without using a CPU IP core that is utilized or shared by other IP cores on the integrated circuit.

FIG. 1 illustrates a block diagram of an embodiment of a SOC having multiple initiator IP cores and multiple target IP cores that communicate read and write requests, as well as responses to those requests over an interconnect. Each initiator IP core, such as a CPU IP core 102, an Dedicated processor IP core, a Digital Signal Processor (DSP) IP core, and other similar IP cores may have its own initiator agent to interface with the interconnect 104. Each target IP core, such as a first DRAM IP core 106 as well as a FLASH ROM memory IP core 108, may have its own target agent to interface with the interconnect 104.

The Intellectual Property cores (IP) have self-contained designed functionality to provide that macro function to the system. The interconnect 104 implements an address map with assigned address for the target IP cores, and potentially the initiator IP cores in the system to route the requests, and potential responses between the target IP cores and initiator IP cores in the integrated circuit. One or more address generators may be in each initiator IP core to provide the addresses associated with data transfers that the IP core will initiate to memories or other target IP cores. All of the IP cores may operate at different performance rates (i.e. peak bandwidth, which can be calculated as the clock frequency times the number of data bit lines (also known as data width), and sustained bandwidth, which represents a required or intended performance level).

The interconnect 104 provides a shared communications medium between the IP core sub-systems and devices that may connect to the chip. All the communication paths in the shared communication bus need not pass through a single choke point. Rather, many distributed pathways may exist in the shared communication bus. The on-chip interconnect 104 may be a collection of mechanisms that may be adapters and/or other logical modules, along with interconnecting wires that facilitate address-mapped and arbitrated communication between the multiple Intellectual Property cores.

Within some of these IP cores, they may have different domains of one or more hardware components sharing a common voltage and clock frequency characteristics and operating states. Domains may comprise one or more components that share a voltage or clock operating characteristic and operating state (indicated as dashed lines on FIG. 1). Multiple domains may exist within each IP core. Most of the distinct IP cores communicate to each other through the memory IP cores on and off chip. Each domain may be separately controlled to receive its own power and/or clock operating characteristics. Power and clock sources (example Vpcu and PLLcpu) may be individually controlled (indicated as right arrows on FIG. 1). Therefore, certain domains may be separately powered (power gating A), or may be separately clocked (clock division and/or gating B), or may provide other mode operating characteristics (such as for example, low power mode C).

A power manager 118 may be implemented in hardware, or a combination of hardware and software to control the power consumption of two or more domains and transition an appropriate domain in the SOC to a desired mode. The power consumption may be controlled, for example, through the voltage and clock operating characteristics. Thus, the power manager is an "intelligent" component, i.e. executes an algorithm autonomously, that chooses when, why and how clocks and power (and back biasing) are distributed to the associated domains, making decisions without external help. The power manager may control the power consumption with or without using the CPU of the integrated circuit to execute power management instructions, and may also be applied to a single domain.

The power manager may be used to support the advanced power management techniques, including clock gating and scaling, voltage scaling, different voltage and/or clock domains, power gating with various state retention strategies, and any combination of these. The power manager may extend power management to all system components including the CPU IP core 102 and other masters, slaves, interconnects, etc., and provides a coherent power management policy across the entire system. Embodiments may further define, and fully support, an advanced communication protocol between the power manager and functional blocks, including IP core status, IP core state and activity, and power management commands; but still remains flexible to easily support various existing methodologies.

The power manager itself may be implemented in the most aggressive, power saving methodology, with clock and power gating whenever supported and possible for its logic. The power manager may also provide a complete verification methodology for the power management function both at a module level and at a top level.

Figure 2:
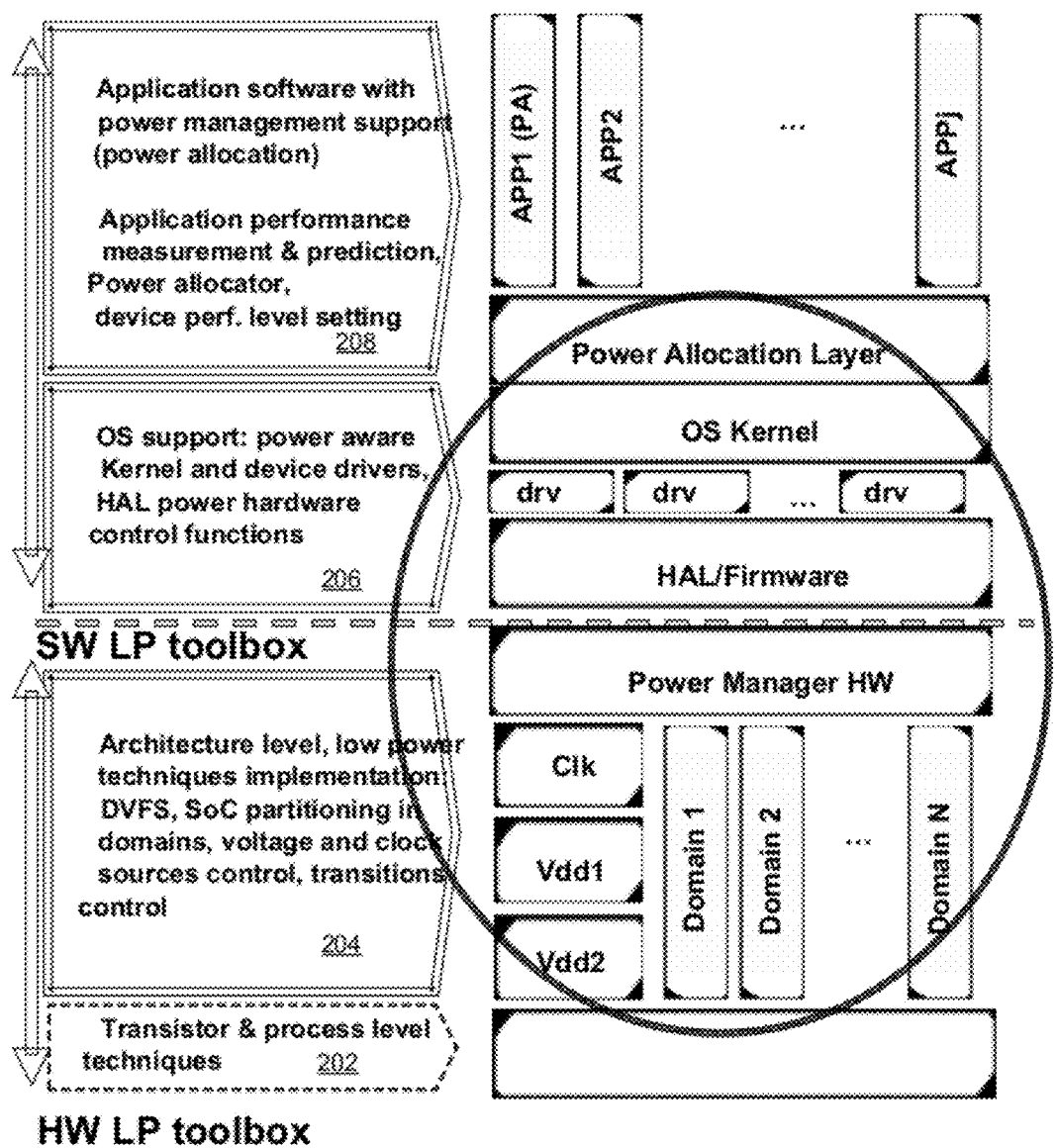
FIG. 2 illustrates a block diagram of an embodiment of exemplary hardware and software component combination to implement embodiments of the power manager.

FIG. 2 illustrates an exemplary hardware and software component combination to implement embodiments of the power manager. The power manager functionality will be distributed amongst a set of modules, some exist in hardware, and some exist in software. Software means that the modules are made of code executed on a programmable device. The programmable device may be part of the power manager central controller. All or part of the software may be run within the power manager, or may be run on other components separate from the power manager. For example, the application software 208 is run on non-power manager cores, while the lower power techniques implementation of 204 may be handled within the power manager central controller.

The power manager may be implemented in two or more hierarchical layers. For example, four layers of hardware, software combinations are used. For this exemplary embodiment, the hardware layers may occur at the architectural levels 204 over the SOC silicon implementation level 202. The software levels may occur at level 206. A lowest software layer may be the hardware abstraction layer (HAL). The functions in this layer will be generated along with the Register Transfer Level (RTL) describing the hardware layer of the power manager and will simplify programming the hardware by providing abstraction of the bits and registers details. A second software layer, a device driver foundation layer, may implement the key functions that abstract the controller behavior from its implementation. In this layer, there will be functions to configure the SOC power modes by defining mode tables (HMT) and controlling the chip current state. Additionally, there may be support for handling power manager events routed to the software. A third software layer, an OS support layer 206, may provide implementation of the most common Operating Systems power management functions. These functions usually comprise kernel level functions and device driver functions. For instance, in Symbian, the DPowerModel and DPowerHandler objects will be generated automatically. Finally, the last layer 208, an Application Programming Interface (API) is available to implement power allocation mechanism in a system where applications are power-aware.

At the lower levels 204, individual domain controllers comprising hardware logic of the power manager transitions components in an associated domain in the integrated circuit into and out of a desired power consuming mode, and cooperates with a software based power management component including an operating system, at the higher levels. The amount of domains on the integrated circuit may also be a configurable parameter set by a chip designer at run time fabrication of the chip, and each domain may have its own domain logic controller as well as activity detector. The amount of hardware instantiated required for a given design may be scalable to the configurable parameter set by the chip designer.

The power manager may include a hardware logic component inside each domain controller to act as a local power controller to execute policy, watch system states, and/or handle conflict resolution when power management instructions overlap on shared resources. The power controller, including individual domain controllers, may control the power consumption state at a granularity of individual logic functions making up an IP core to a granularity of multiple IP cores each with potentially millions of transistors being controlled by a signal domain controller. Therefore, one IP core can be split into multiple domains as required. For example, a CPU can be broken down into ALU, cache controller, etc. Alternatively, multiple IP cores can be grouped and controlled as a grouped unit. The number of domain controllers and what components they monitor and control may be a design time configurable parameter for each instance of the power manager on that SOC.

A system operating state may be the compound state of all the state machines that exists in the SOC, which might have an influence on the system power consumption. In this context, each operating system running on each of the SOC processor can be viewed as an independent state machine, which can be executing a task, waiting for an interrupt (idle), processing an interrupt, etc. The concept is also extended to devices and device drivers, which can be in different power states, independently from the operating system state; and generally to any other hardware state machine, like intelligent DMA, whose state can evolve independently from the others elements in the system. Finally, included in the concept of system state may be physical parameters coming from sensors and SOC activity observation logic, if any. As an example of such parameters, the device temperature, the battery charge level, or CPU activity counters values can be considered. All these inputs may be useable by the current power management policy, to select the optimal operating point.

The power controller may reside under the supervision of the standard power management software, which may control things like whether the integrated circuit is in active mode, a power savings mode such as hibernate mode and sleep mode, or off. For example, the power manager may have its own dedicated CPU or dedicated state machine to execute power management instructions. The standard power management software, such as the Operating System of the SOC, can transition sections of the chip or components of the chip into and out of power saving modes in hundreds to hundreds of thousands of clock cycles. Whereas the power controller, including the hardware logic level, can transition the one or more components they are monitoring and controlling into and out of power saving modes in a few cycles to tens of clock cycles, such as for example within 5, 15, 25, 40, 50, 100, or 250 clock cycles. The overall power savings of the integrated circuit beyond power savings with the standard power management software may be a 25% or more gain in power savings and thus longer battery life. The transition times associated with a pure software approach to power management may be in the order of 1,000 to 10,000 cycles or more, which may be on the order of 1 ms to 10 ms or more.

As the power controller includes a hardware logic portion to control a power consumption of two or more domains, the individual domain controllers can transition one or more components they are monitoring and controlling in an appropriate domain into and out of the desired power consuming mode faster than conventional systems. For example, the power manager may have a dedicated CPU and the dedicated CPU cooperates with an Operating System dedicated for the power manager so that the power manager controls the power consumption of two or more domains without an Operation System that interacts with applications on the integrated circuit governing the rest of the CPU cores being utilized to transition components in the power domains into a first power consuming mode and back out of the first power consuming mode into a second power consuming mode. Accordingly, a domain controller can transition one or more components they are monitoring and controlling into the desired power consuming mode in generally less than 250 and preferably less than 50 clock cycles and transitions the appropriate domain out of the desired power consuming mode in generally less than 1000 and preferably less than 100 clock cycles.

Accordingly, the power manager may include intelligent hardware support of the power management function, which scales well with the chip complexity without relying on an increased software support. The power controller is scalable, in that its architecture has no hard limits in terms of number of clock/power regions it can handle (going from tens to hundreds to thousands), while only using the hardware required for a given design; and does not increase proportionally its reliance on external software for its operations.

The power manager may also include software related system states (OS, device driver states) communicated from software layers to the power manager hardware layers by register access. Accordingly, the power controller defines a hardware interface between the power manager and SOC logic. Communication between the hardware power controller and the domain controller units may use a power management oriented protocol. The standard power management software may be Operating System-directed configuration and Power Management (OSPM) software. This software may rely on the Advanced Configuration and Power Interface (ACPI) specification to provide an open standard for unified operating system-centric device configuration and power management.

The power manager may have memories that store object code and object data members, which may make its behavior easy to modify after the chip is manufactured. Part of this memory might be read-only, and power management functions residing there cannot be changed at runtime, and part of this memory may be read/write, which makes the power management functions residing here changeable or loadable at chip boot time. Note that these memories may be completely private to the power manager programmable device, and no other device in the system may be able to access them (except for content update, through the register interface of the power manager). Alternatively, the system may include a semaphore like region in which other system components could directly access the power manager memory locations/registers. Therefore, although the power manager is intelligent, its behavior can be both loaded at boot time to adapt to various usage models of the SOC, while being run-time changeable to adapt to the SOC to different operating conditions.

The power manager may have a distributed implementation. Its functions may run into multiple different modules on the chip. Some of its functions might be implemented as pure hardware modules. Some others might be implemented as software code or microcode, running on dedicated sequencer or processors. Communication of events and data between the functions running on different modules can be seen as remote data access of one functional unite to another, or remote functions calls. It may be the job of a communication network to transport functions calls and execute data access between functions residing in the pure hardware domain but in different hardware modules, and between functions inside the hardware domain and the software domain.

Figure 3:
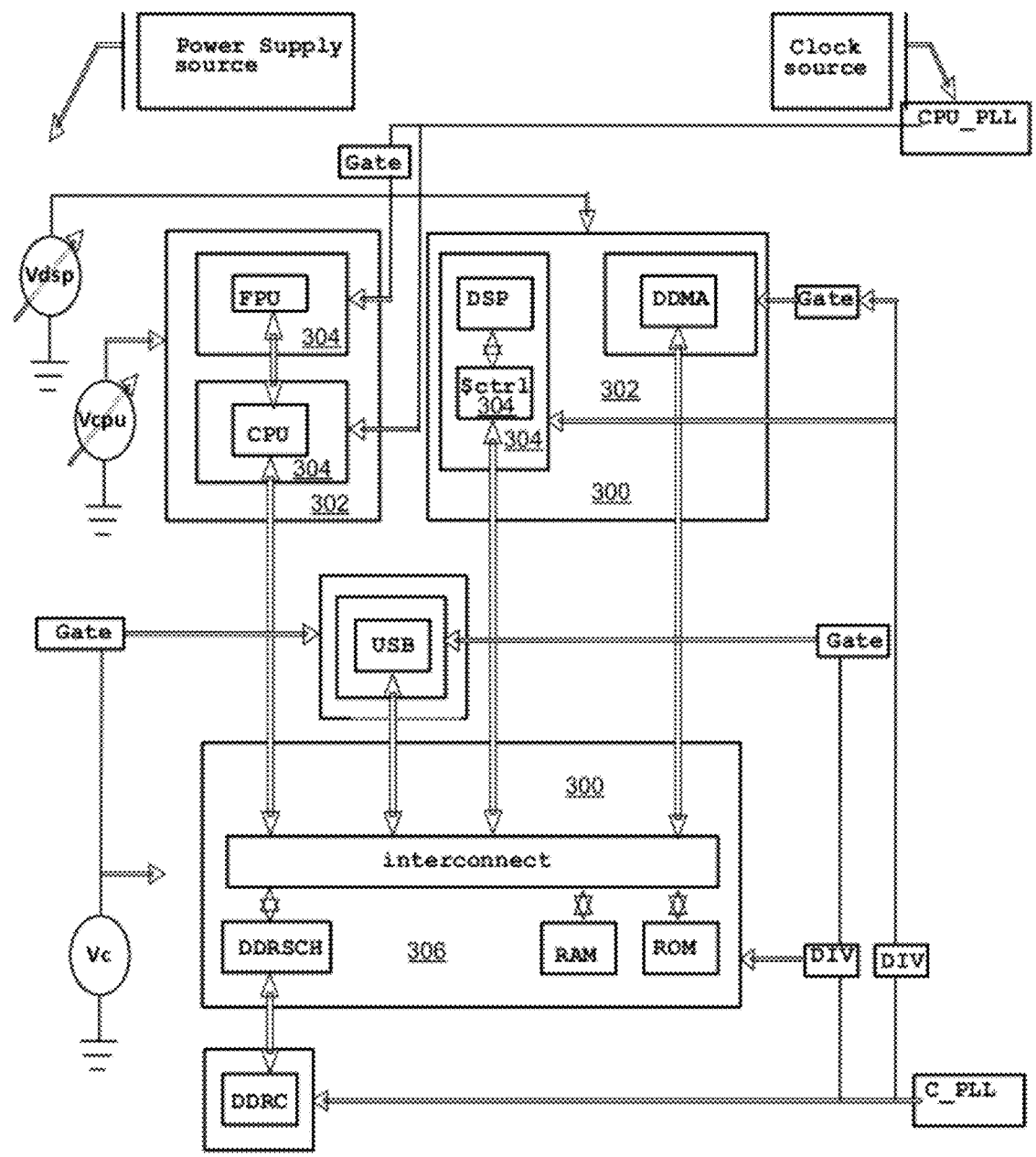
FIG. 3 illustrates a block diagram of an embodiment of an exemplary SOC partitioning into domains, along with exemplary associated clock and voltage sources to utilize embodiments of the power manager.

FIG. 3 illustrates an exemplary SOC partitioning into domains, along with exemplary associated clock and voltage sources to utilize embodiments of the power manager. In an exemplary embodiment, the power manager is focused primarily on power management of complex SOC, that is, chips with multiple masters and slaves connected by advanced interconnects, and with one or more of the masters executing software. The software can be as simple as basic firmware or as complex as applications executed on top of a commercial operating system. Such SOC implementing advanced low power techniques will typically be partitioned into a set of hardware power management entities or "domains." Domains 300 receive clock and power supply from generators, collectively called "sources."

For example, the SOC may be partitioned into two or more domains 300. Each domain 300 of the two or more domains includes one or more components that share voltage 302, clock 304, or both voltage and clock 306 operating characteristics and operating states. The power consumption of the two or more domains 300 may then be controlled through advanced power management techniques comprising clock gating, clock scaling, voltage scaling, power gating, or any combination of these.

Accordingly, the overall integrated circuit may be organized into a number of voltage, clock, and other similar domains 300. The domain controller may be a hardware device in charge of controlling the distribution of clock and power supply to one domain under the control of a power management function executing a power management policy, or policy execution engine. The domain controller may locally alter clocking signals and voltage signals by turning them on and off, changing a mode of the clock or voltage, changing a level of the clock or voltage signal for that domain, or other power state, clock nodes, frequency, voltage alterations.

The logic in each domain may itself be implemented using low power techniques such as clock gating, multiple voltage cell, reverse body bias, etc. However, embodiments of the power manager as described herein is novel over the conventional low power techniques currently used in advanced SOC. The power manager according to embodiments described herein includes techniques which have a dynamic and controllable effect. For example, the power manager may utilize a higher level of clock gating, power gating, dynamic voltage and dynamic frequency scaling. The power manager IP also provides the control required by the techniques categorized as above, both at the hardware and at the software level.

Figure 4:
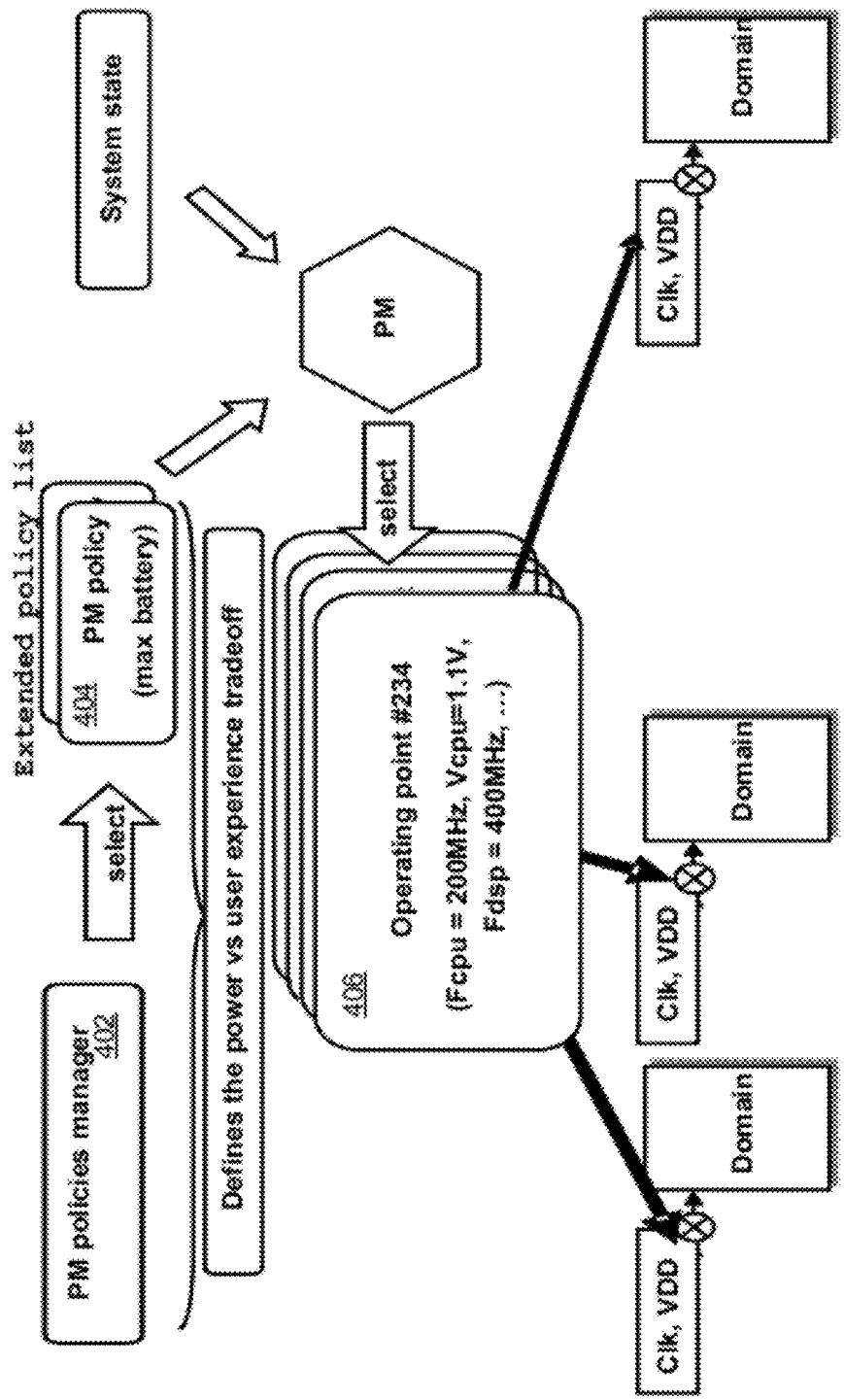
FIG. 4 illustrates a block diagram of an embodiment of an exemplary hierarchy of the power manager.

FIG. 4 illustrates an exemplary hierarchy of the power manager. FIG. 4 illustrates the organization of the (distributed) algorithm implemented by the power manager to take its decisions. The hierarchy of the power manager may include two or more layers. For example, three layers may be used, each with a separate mission, wherein a top level of the hierarchy comprises a policy manager 402, an intermediate level comprises two or more power management policies 404 in which the policy manager selects a power management policy to implement, and a low level comprising operating points 406 that map a desired operating state of a domain to operation voltage and clock frequency values for that domain (an operating point).

Up in the hierarchy, there may be power management policies 404. The power management policy 404 maps the different system operating states to different operating points 406 according to a desired user experience, for instance, to maximize energy savings, or as another example, to maximize system reactivity. A power management policy 404 will decide when and how the system shall transition from one operating point to another. The power manager may include an execution engine to implement a chosen policy.

The power management policies may be stored in a table, hierarchical table, register, matrix or some combination of the three that map different system operating states to different operating points 406 to improve and/or maximize energy savings for a given policy. The policies may be configured and/or programmed into the table, register, or matrix by a chip designer. The chip designer may run multiple simulations to perfect knowing which components affect other components when the chip runs and how much power is saved. The chip designer may make a matrix of power saving to be referenced and which components can be powered off for small granular time periods depending on which application is running.

The power management policies may be initially set after the simulations, but may also be updated during device operation based on actual user feedback or additions of new applications executing on the integrated circuit. Accordingly, the table, register, or matrix may be programmable, so that its behavior can be changed at run-time to support different chip operating modes. Therefore, multiple power management policies may be programmed and or updated by a chip designer at design time, run time, or after fabrication and by a user during operation.

In an exemplary embodiment, the chip designer or user will be responsible for providing the power management policies. The policy defines the tradeoffs between user experience and power consumption. Accordingly, the chip designer or user may determine a set of policies that appropriately balance these tradeoffs. An example power management policy 404 may favor faster performance over battery life, or vice-versa.

There may be another power management function on top of the power management policy 404: the policies manager 402, which selects an active policy 404 amongst the set of possible ones. The policies manager 402 may be implemented in its own layer or may be incorporated into another function or layer of the power manager.

Operating points 406 describe the functional dependencies between different domains. For instance, a CPU that executes a particular task will access multiple different slaves through an interconnect during that task. Hence, there must be coherence between the power state of the CPU, the power state of the interconnect, and the power state of these slaves. They are functionally dependant; if the CPU and the memory can work at multiple voltages and frequency, then maybe a slow CPU does not need to access a fast memory through a fast interconnect. This decision is application dependant and as described above, may be under user control. Such decisions may be described inside the policy as a particular set of operating points 406 which enumerate coherent power states for all the involved elements for a particular SOC function.

In an exemplary embodiment, the operating point 406 is a named data structure that expresses the intended power state of the SOC given a particular system state and under a given power management policy 404. Referring to FIG. 4, multiple operating points exist: Op Point 0, Op Point 1, and Op Point 2, with the exemplary Operating Point #234 (Fcpu=200 MHz, Vcpu=1.1V, Fdsp=400 MHz, . . . ) represented, which is the set of coherent power states for the SOC domains.

An operating point 406 is thus one of the possible combinations of the SOC domain states. A domain state is a named data structure that encapsulates the minimum set of physical and discrete parameters that describe the domain performance level and associated energy cost. For instance, if a CPU domain can operate at multiple voltages and frequencies, the CPU domain state will be expressed by the (F, V) doublet.

Table 1, below, illustrates a simple example of operating points 406 for two representative applications. The operating point 406 defines a coherent power state for the SOC, and describes inter-domain functional dependencies. The operating point 406 only needs to express the dependencies between the domains of the SOC that cooperate to realize a given function, and/or share common sources like a phase lock loop (PLL) or a voltage regulator. If the domains are totally independent, they do not need to be both on the same operating point.

TABLE 1

| Operating point name | CPU | DSP | Graphic ACC |
|---|---|---|---|
| MP3 | (1.0 V, 80 MHz) | OFF | OFF |
| 3D_GAME | (1.8 V, 400 MHz) | OFF | ON |

The definition of operating points 406 may be implemented in either software or hardware or a combination of both depending on the chosen hardware/software partitioning of the power manager. In an exemplary embodiment, the operating point data structures exist in the power manager hardware. In this case, the selection of a new operating point by the policy is simply the selection of one such structure in the power manager, which will take care automatically of the communication with the domains. In an exemplary embodiment represented further in FIG. 5, below, the operating point data structures may exist in software, and rely on software functions to communicate with each domain the changes in clock and power control values that result from a change in the selected operating point. In this embodiment, a domain controller may be used to execute the operating point transitions as software functions.

Figure 5:
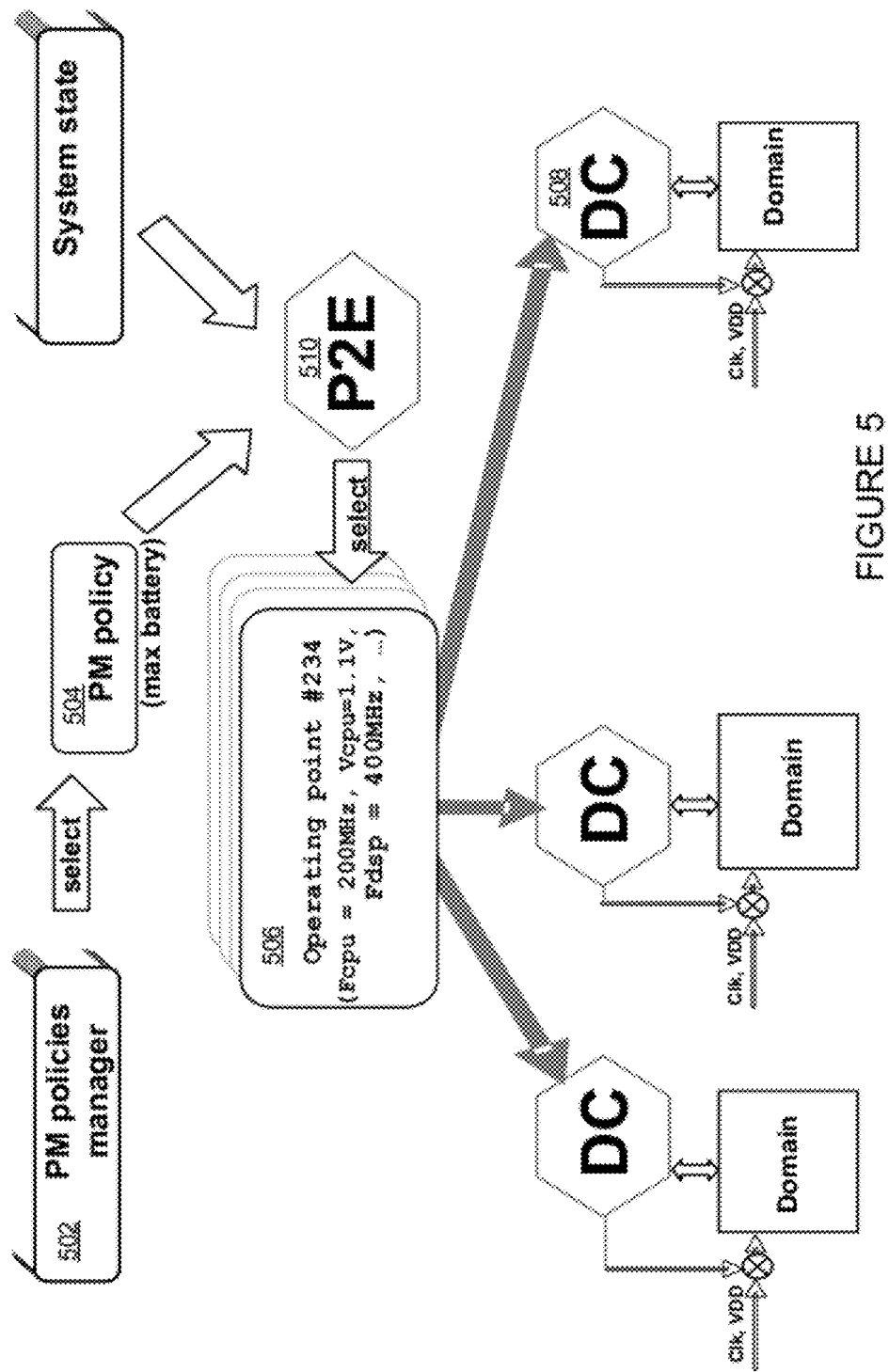
FIG. 5 illustrates a block diagram of an embodiment of an exemplary hierarchy of the power manager.

FIG. 5 illustrates an exemplary hierarchy of the power manager. FIG. 5 shows the hardware components, including an exemplary policy execution engine and domain controllers, that execute the (distributed) algorithm, as shown for example in FIG. 4. Power manager may be implemented using a hierarchy of two or more layers, such as four, each with its own mission. At the top of the hierarchy, a policy manager 502 may choose from one or more power management policies 504, which each map operating states to operating points 506, and then a local domain controller 508 enforces the operating points. Thus, the power management function is organized as a hierarchy of abstract "objects" interacting with each other—the hierarchical structure including a) a policy manager 502, then b) power management policies 504, then c) operating points 506 and at the bottom d) domain controllers 508.

As illustrated, the power manager hierarchy may include a policies manager 502, power management policies 504, and operating points 506 similar to those as described above with respect to FIG. 4. The power manager hierarchy may also include a lower hierarchical level including domain controllers 508 to receive the operation point 506 and transition components in that domain into and out of a desired power consuming mode based on the newly received operating point.

As generally described above, the power management policies 504 are data structures to map system operating states to operating points. For example, these data structures may be static descriptions of a mapping between system states and operating points, while the operation point may be a static description of control values for clock and power distribution networks given a power management policy.

Also as generally described above, the power management policies may be stored in a table, hierarchical table, register, matrix or some combination of the three that map different system operating states to different operating points to maximize energy savings for a given policy. The table, register, matrix may further be programmable, so that its behavior can be changed at run-time to support different chip operating modes so that the multiple power management policies can be programmed and or updated by a chip designer at design time, run time, or after fabrication and by a user during operation. Permitting the chip designer to implement different tradeoffs between performance and power consumption may be used to differentiate a device manufacturer over its competitors.

In an exemplary embodiment, the power manager functions need to "execute" policies by observation of system state, and control domain state transitions. Therefore, the power manager may further includes a policy execution engine 510 to execute a power management policy, and a domain controller 508 to execute transition towards the operating point 506 so that the domain controller 508 transitions a selected domain from its current state to a new state as indicated by the operating point mapped from the selected power management policy executed by the policy execution engine.

As shown in the figure, power management policies are static descriptions of a mapping between system states and operating points, therefore the policy need to be "executed" by an active entity, called P2E (policy execution engine 510). Once the policy manager entity has chosen an operating point, which is also a static description of control values for clock and power distribution networks, it needs to be "executed" in turn, that is, domains must transition from their current state to the newly chosen one. This is the job of the DC (domain controller 508) entities.

No assumptions are made about where all these power management functions reside, whether they are implemented in pure hardware or as software, and if in software whether they exists in the operating system, the device drivers or the application space. Preferably, the objects are implemented in hardware when reactivity is important; however the proposed power manager IP shall be flexible enough to enable very different implementation tradeoffs to better suit a particular application need.

Down in the hierarchy there may be domain controllers. The domains controllers may be in charge of ensuring that domains transition between power states so that their state evolves towards the operating point defined by the current policy. Domain controllers may take care of all the operations related to transitions between states, including enforcement of low level inter-domain dependencies, like specific order for domains wake-ups, complex transitions sequences, etc. Thus, the domain controller may enforce low level inter-domain dependencies including controlling transition sequences.

The domain controllers may further include one or more activity detectors, as described more fully below, to determine a current activity level of one or more components of a selected domain. The domain controller may additionally include power conflict resolution logic to detect and manage conflicts between the power manger policy desired power consumption mode and the activity level of the associated power domain such as an IP core being supplied by the activity detector. Other conflicts may result in different power modes requirements coming from different SOC elements that share the domain. For instance, if a memory is inside a domain and is used by a CPU and a DSP, the CPU may need to run the memory with high performance while the DSP can allow the memory to run in a slower power saving mode.

Accordingly, the domain controller may be the functional element in charge of managing interaction directly with one power and/or clock domain. The number and connectivity of domain controllers may be derived by the power manager creation tool from the description of the partition of the SOC into domains, which can come from a file, or any other suitable method, as discussed below with respect to FIG. 13. Preferably, the power manager configuration tool will offer a hardware implementation of these domain controller objects.

A clock or power domain will have a state representing its current status with respect to power saving features, that is, the values for the controlling elements of the power and clock distribution networks that it drives. This state will be stored into corresponding domain controller. A set of domain controller functions may allow control over the power state of the domain and transitions between states, and another set of functions will be targeting domain status query. The power management policy will interact with the domain controller through calls to these functions.

Figure 6:
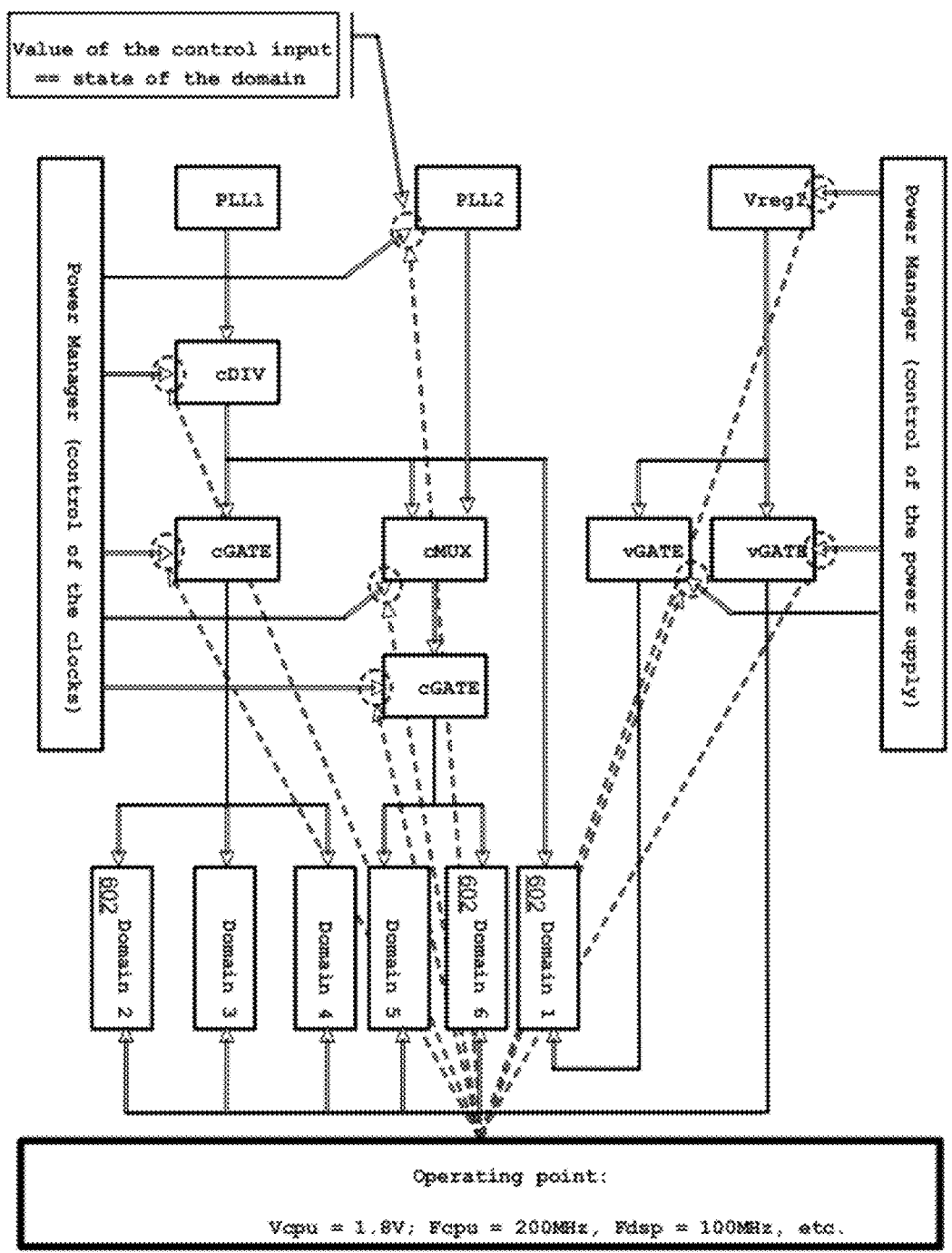
FIG. 6 illustrates a block diagram of an embodiment of an exemplary complex SOC partitioned into multiple clock and voltage domains, each having a local domain controller.

FIG. 6 illustrates an exemplary complex SOC partitioned into multiple clock and voltage domains 602, each having a local domain controller. FIG. 6 also illustrates an example concept of the operating point, which is a set of settings for the controllable sources. The chip designers may be responsible for the definition of the collection of operating points of the SOC given the structure of the clock and power supply distribution networks, and the functional dependencies that exists between domains. A power management policy, executed, both through hardware or software, as described below, may select an operating point and indicate it to the power manager so that it can take the required actions to put the domains in the corresponding power states.

In an exemplary embodiment, the power management policies may be implemented by executing transitions to the operating point in the corresponding domains. The transition from an operating point to another operating point through the domains may be handled at least in part through hardware logic. The selection of a new operating point, expressing the intended power state of the domain given a particular system state and under a given power management policy, will automatically transition a domain to the desired operating state by supplying an operation voltage and clock frequency value as determined by the operating point and controlled by one or more hardware components. Exemplary hardware components to implement various operating points and locally transition a given domain into and out of a power consuming mode may consist of asynchronous clock sources, clock division, clock mux, hardware clock gate, power and/or signal diverter, power and/or signal splitter, controllable power regulators, finite state machines, clock, phase lock loops, or any combination of these. Therefore, the selection of a new operating point expressing the intended power state of the domain given a particular system state and under a given power management policy may automatically transition a domain to the desired operating state by supplying an operation voltage and clock frequency value as determined by the operating point and controlled by one or more hardware components.

In an alternate exemplary embodiment, the operating points are named data structures expressing the intended power state of the domain given a particular system state and under a given power management policy stored in software visible registers, tables in memory, or any combination of both. The power manager hierarchy in this embodiment may further include a low level hierarchical level including domain controllers to receive software functions requests in response to the selected operating point transition request and using hardware logic to transition clock and power control values of each domain that result from a change in the selected operating point.

Another view on the operating point concept, as described above, the SOC clock distribution structure can be represented by a set of interconnected trees. In these trees, each node represents a modification of the clock and arcs represent the relationship "provides clock to." The nodes are typically made of a combination of gating, division, multiplexing, etc. Some nodes have a controllable effect: they may be the nodes driven by the power manager. The value of their control input is their state; and the set of all these states for all domains in the SOC, the set of all operating points of the SOC with respect to the clock. The same concept is used for power supply distribution.

Figure 7:
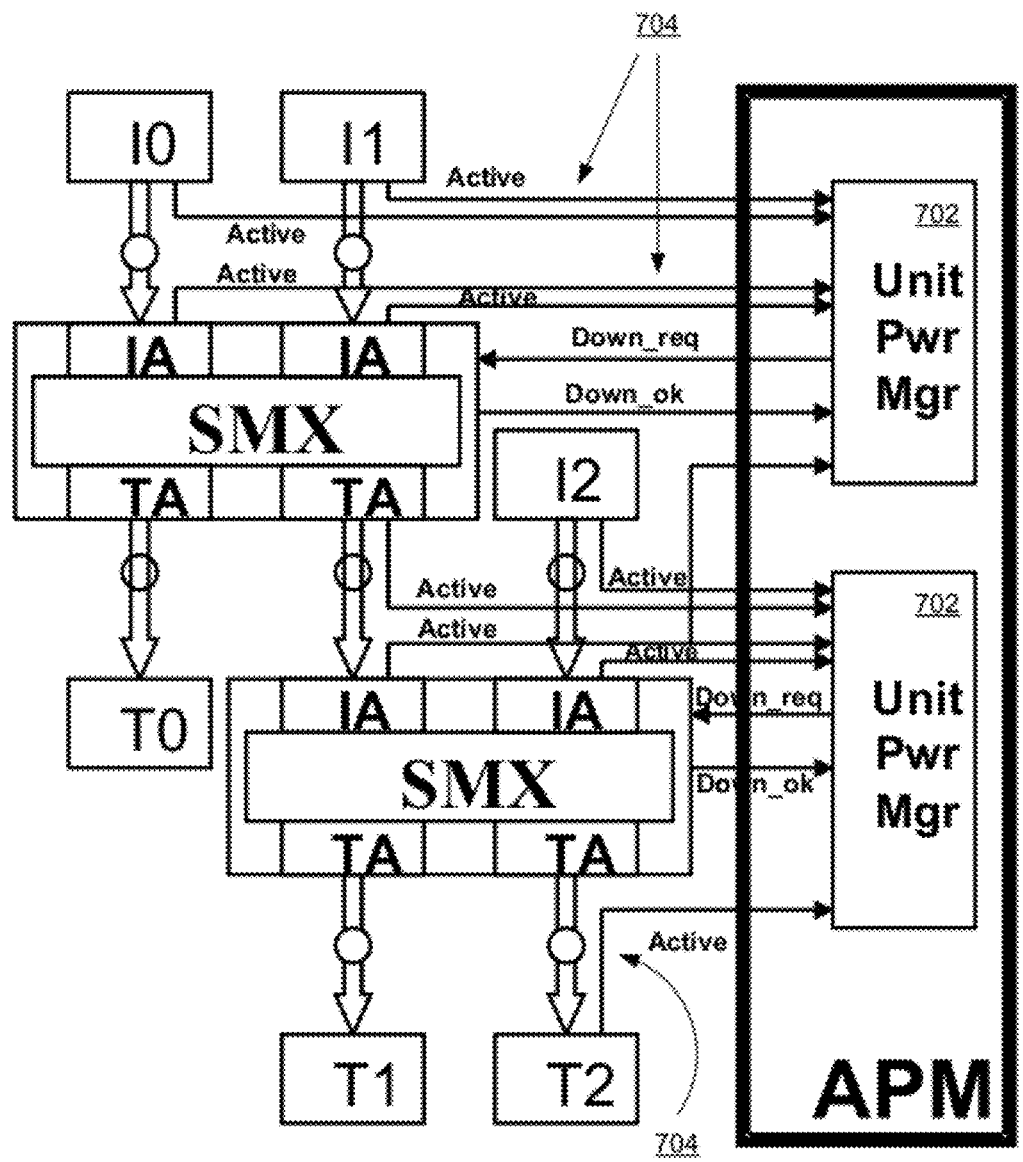
FIG. 7 illustrates a block diagram of an embodiment of exemplary power managers with activity detectors for one or more components of the associated domains.

FIG. 7 illustrates exemplary power managers 702 with activity detectors 704 for one or more components of the associated domains. For example, each domain controller, with its own set of activity detectors, may detect whether activity is occurring for one or more components in that domain. Logic may also be included in the power manager and at the domain controller to detect and manage conflicts between the power related commands from the power manager to the selected domain and the power related information indicating current activity of the selected domain. Accordingly, domain controllers to receive the operating point and transition components in that domain into and out of a desired power consuming mode may be based on an activity occurring or anticipated to occur in that domain and guidance from the power management policy being implemented.

In an exemplary embodiment, the power manager includes one or more activity detectors to detect activity from a particular power domain, where the activity detector is configured to sense and communicate an activity level in an associated power domain, such as an IP core, to the upper layers of the power manager, and the upper layers of the power manager include logic to alter the power consumption state of the particular power domain according to the current level of activity, a transition time to transition the domain into and out of the particular power consumption state, and based on a current power management policy being executed.

For the power management policy to be executed, the power management hardware and software may be able to "observe" the state of the system, that is, the parts that matters for the power management policy. The system state, as described above, may typically be made of different information coming from different places in the system. Potential sources for the system state values include: (1) application state, like for instance the SOC current use mode (MP3 player; 3D game, etc.); (2) operating system kernel state, for each of the processors in the SOC running an OS, which is a software state; (3) device drivers states, for each of the processors in the SOC running an OS which handles devices through drivers, also a software state; (4) activity observation and/or prediction mechanisms, which may be either or both software and hardware states.

The activity detectors may be implemented through the use of software and/or hardware components to monitor the activity of the desired components. For example, the power manager software may include code inside the software layer that monitors processor activity or gather performance requirements from power aware applications. The power manager hardware may include statistics collection logic that monitors traffic on a socket, or any other form of activity observation module; or even simple activity information like the one available on the advanced power bundle, described below, FIG. 7.

A set of activity detector logic units may be included for each domain controller, which feed dynamic signals of whether activity is occurring for one or more components in that domain. The activity detectors may detect external information at chip level that matters to power management, like battery charge level, PLL lock information, temperature sensors, process sensors, and current activity levels. Instances of the set of sensors may be fabricated as part of the interconnect because the interconnect can detect whether activity is going into or coming out of an IP core due to the communication traffic and the type of traffic coming in and out of IP core, which is also being communicated over the interconnect.

Figure 8A:
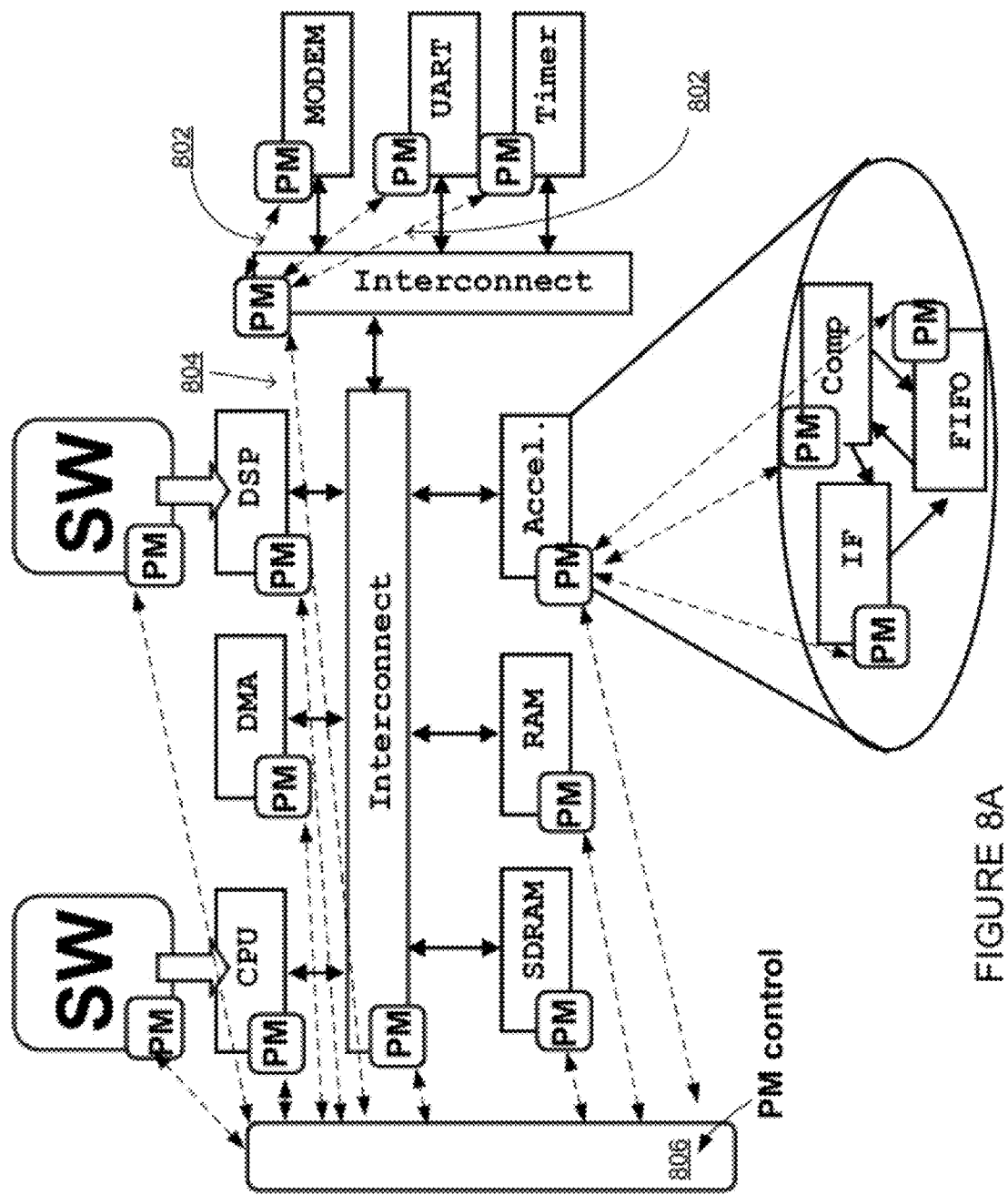
FIG. 8A/8B illustrate block diagrams of an embodiment of interdependencies between domains of the SOC and groupings/partitioning of domains into groups and supergroups.
Figure 8B:
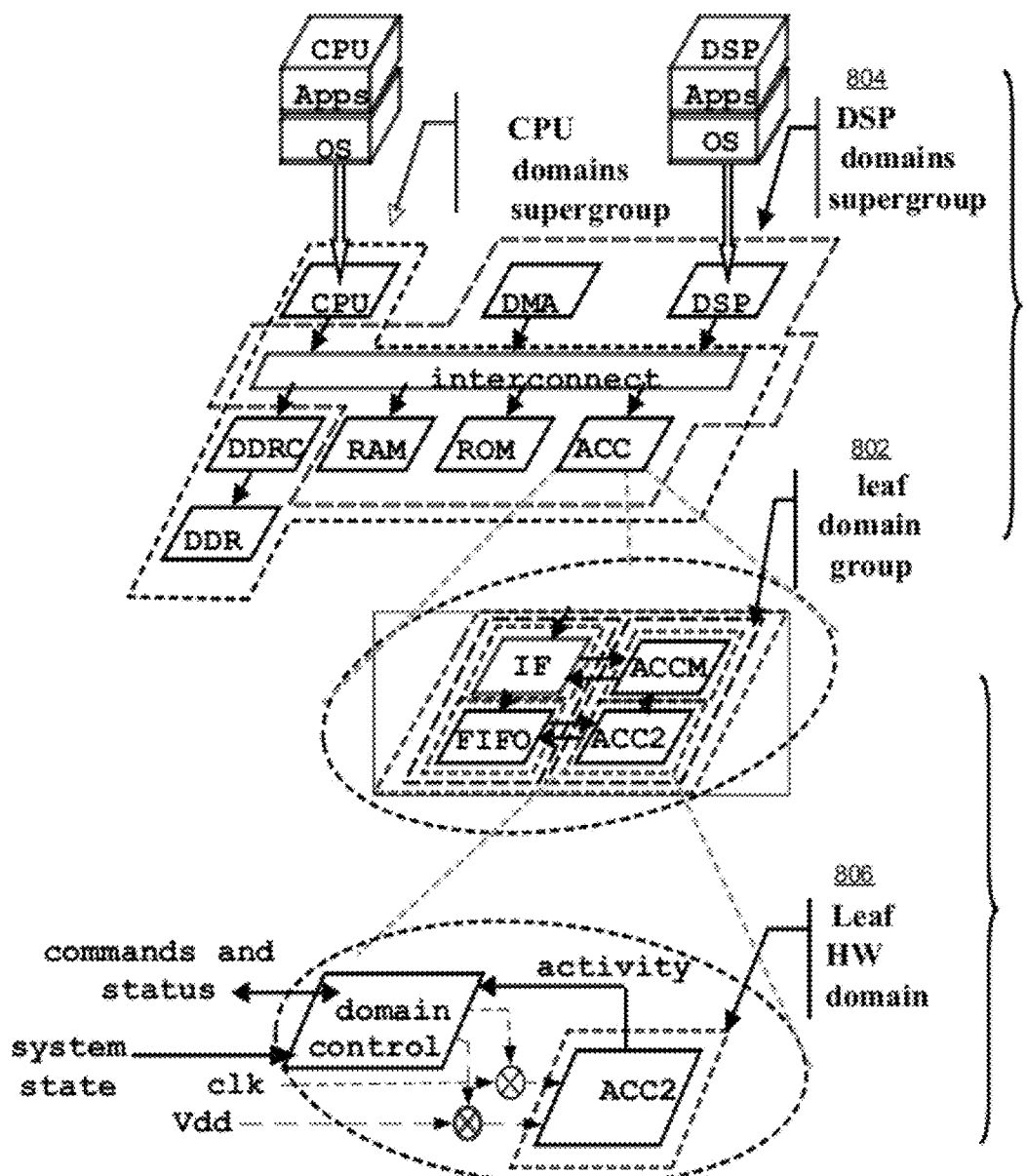

FIG. 8 illustrates interdependencies between domains of the SOC and groupings of domains into supergroups. The power manager may include groups of domains 802 representing a first level of operating point specification, in which the groups of domains are hierarchically combined into supergroups 804 that follows the hierarchical organization of the integrated circuit. The power manger may include a hierarchy of controllers 806, wherein a local state is made visible to the power manager through a domain controller, and a system state is made visible to the power manager through hardware and software tools, to transition the groups of domains into and out of desired operating states. The hierarchy of domains into groups and supergroups allows arbitrary grouping of domains into power management entities.

With complex hierarchical SOC, the combination of sub-system level operating points into a system level operating point may be achieved. Since complex SOC are typically built by combining sub-systems around an interconnect, and each sub-system itself can be the combination of smaller sub-systems, for example a CPU with cache, there is a need for a hierarchical structure for operating point specification that follows the hierarchical organization of the SOC. This hierarchical description may be based around the concept of groups of domains, which represent the first level of operating point specification; and which can be in turn, hierarchically, be combined into groups of groups or supergroups.

A group of domains may represent the smallest entity for which specification of an operating point makes sense. Typically, this will be a subsystem, with a few power states. A supergroup may then represent the complex power management entity that encompasses all the domains that cooperate to realize one SOC function. For example, with respect to FIG. 8B, the CPU and the DSP have their own supergroups, which comprise all the resources they need to operate. The supergroup concept can be extended beyond the master-centric view of the system. An interrupt controller, for instance, can be managed using a supergroup which comprises all the system elements required to react to an interrupt.

Since some domains will be controlled by multiple different group hierarchies, the chip designer, or user, may be able to define "resolution functions" which select the desired power mode of a domain given multiple different desired states. For instance, if a memory has multiple power modes, and is shared by multiple masters (like the CPU and the DSP sharing the RAM, of FIG. 3), it might be required that even if all the masters are slow, the sum of their traffic still require a faster memory than what each of them is requiring at that time.

As described above, the hierarchical operating point specification may also support conflict resolution as generally described above. For example, conflicts may be detected and managed by domain controllers. The domain controllers may receive from the central controller instructions in the form of domain analysis processing model (DAPM). The domain controller may identify from where the DAPM is received, so that it can detect conflicting situations. In the case of a conflict, a resolution function is called, which will attempt to guarantee the best service for the domain that need the most performance. There may be a default resolution function which forces the domain in the highest performance/highest power consumption settings in case the system designer, or user has not specified a particular resolution function. Conflict resolution may also be made hierarchical.

Figure 9:
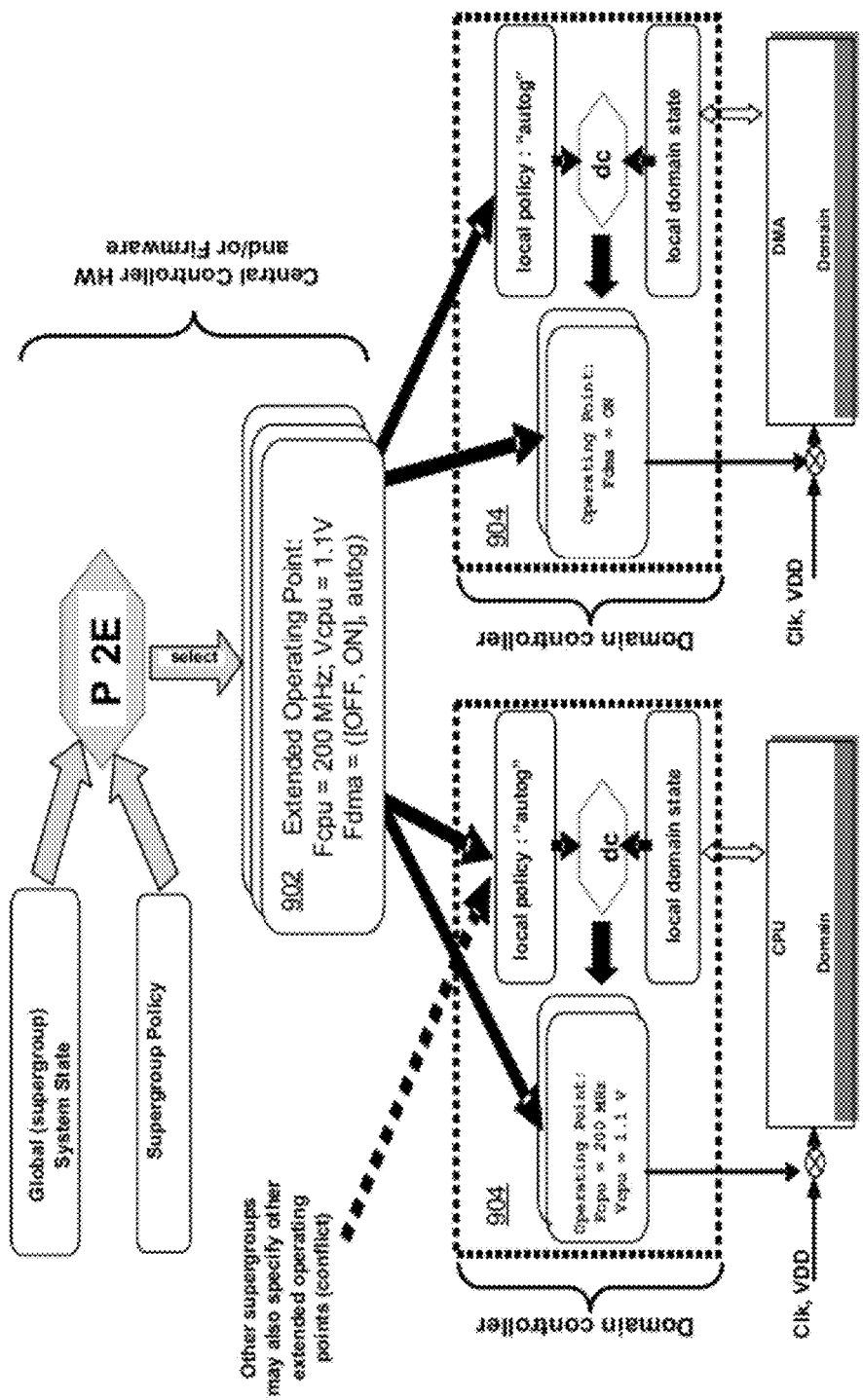
FIG. 9 illustrates a block diagram of an embodiment of an exemplary power manager utilizing a two-level hierarchy of supergroups and groups.

FIG. 9 illustrates an exemplary power manager utilizing a two-level hierarchy. The embodiment as illustrated in FIG. 9 is preferred for use with groups and supergroups, as discussed above, FIG. 8, for a hierarchical entity operating system.

As described above, the power manager may include groups of domains representing a first level of operating point specification, extended operating point 902, in which the groups of domains are hierarchically combined into supergroups that follow the hierarchical organization of the integrated circuit. The power manager may similarly include a hierarchy of controllers, wherein a local state is made visible to the power manager through a domain controller 904, and a system state is made visible to the power manager through hardware and software tools, to transition the groups of domains into and out of desired operating states.

An upper level, where operating point are described in (hierarchical) structures which specify lists of possible values for the power state of a domain (resp. groups, supergroups), along with a selection function (i.e., a local policy). A lower level that exists inside the domain controllers, which take as input the lists of possible power state values specified by the extended operating points for that domain, and execute the selection function continuously to pick one value.

The current power management policy 906 selects an operating point 902 for the SOC, which is a compound state of all the different domains states. The domain controller 904 may ensure that the domain it controls is in the state specified by the chosen operating point, and if not, may take appropriate actions so that it transitions to it.

The supergroup is the entity that is managed by a power management policy. There may be one such policy per supergroup; and consequently the system state is divided into the states that relates to a particular supergroup. Since in a typical SOC there will be multiple supergroups, each managed potentially by a different policy, and each potentially comprising identical domains (like the RAM slave domain of FIG. 3), the power manager may include mechanisms to resolve conflicts. Power manager transitions that overlap at shared elements may include associated conflict resolution schemes.

As described above, each domain controller may be configured with conflict resolution logic on how to control the power consumption mode of its domain that includes a shared resource by the IP cores of the integrated circuit when one or more power management policies being implemented overlap to control the power consumption mode of a shared resource. Accordingly, the power manager may include a set of one or more activity detector logic units for each domain controller, which feed dynamic signals of whether activity is occurring for one or more components in that domain, where each cycle the activity detector monitors a communication interface into that domain to see if activity is occurring.

System state may now also be defined in a hierarchical way. In an exemplary embodiment, there is a local domain state, which is made visible to the power manager through the domain controllers, using the advanced power bundle defined in the domain controller. There is also a global system state, which is made visible to the power manager through various hardware and software tools. The global state is used by a global policy to select a set of possible operating points, and this set is used at the local level to select one operating point given a local state.

For instance, the upper level of the policy may decide that, given the performance requirements of the application, it is OK to let the local domain controller decide to switch ON and OFF the clock depending on a signal that is provided by that domain (a clock_request signal for instance). It will specify to the domain controller that its extended operating point is {clk=[ON, OFF], auto_clock_gate (clock_request)}; which means that clock gate command can be ON or OFF, and that the domain controller need to use the "local policy" auto_clock_gate which depends on the signal clock_request, and selects the final operating point amongst the 2 possibilities: clock ON or clock OFF.

The advantage of this arrangement compared to a centralized operating point approach is increased reactivity, which can be turned into increased power savings. Domain activity information can be used to make decisions dynamically regarding transition of domains between different power modes, implementing a reactive system where power related decisions are driven by the actual dataflow.

Since the application intent (the local policy and possible operating points) is known by every domain controller, its local decisions remain in line with the expected power/performance tradeoff for the domain it is managing. For instance, one domain controller might be allowed by the application to turn off the clock as soon as there is no activity observed in that domain, and no other domains requires any services from it. Because the decision to switch the clock ON/OFF at the level of the domain controller takes some time, it has some performance impact. But since the application has allowed it through the global (group/supergroup) policy, this means that impact is acceptable. Therefore, the domain controller may switch the clock according to the real use of the domain, thus saving power, at the expense of slower domain reactions on wake-up.

Figure 10:
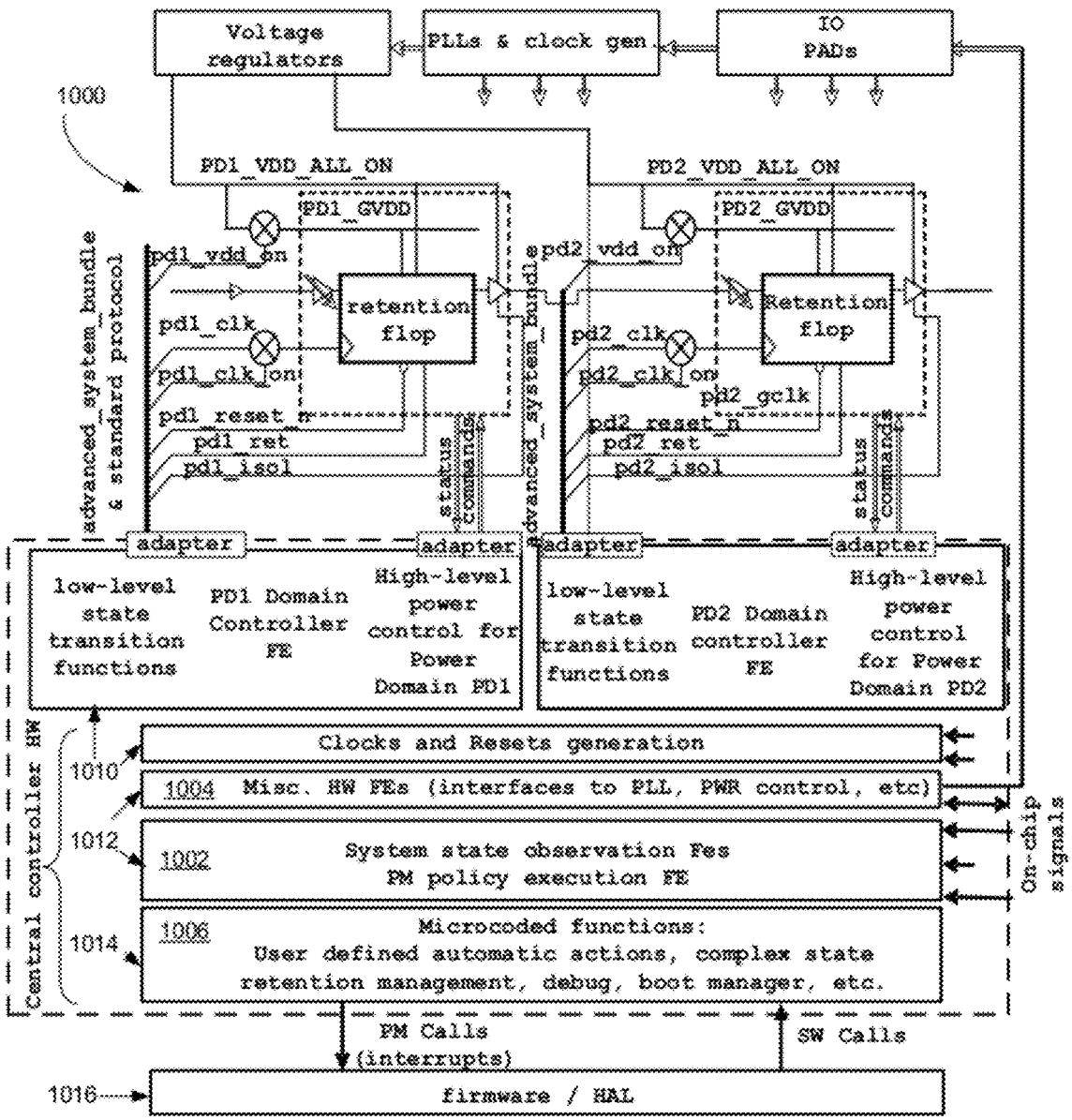
FIG. 10 illustrates a block diagram of an embodiment of an exemplary power manager functions overview including hardware and software components.

FIG. 10 illustrates an exemplary power manager functions overview including hardware and software components. All the functions of the power manager are shown and grouped by their nature. The power manager may further establish a standard way to communicate power related information from the chip functional blocks to the power manager, and on the other way, to communicate power related commands from the power manager to the functional blocks. FIG. 10 shows some of the standard signals 1000 conveyed.

Such communication 1000 may be required to ensure that the transitions between power modes of a functional block are done at the right time and without corrupting the system behavior. For instance, a functional block should not be switched off if a processor is currently accessing it, or if it has some important, real-time task in progress.

As described above, an interconnect for an integrated circuit to communicate transactions between one or more initiator Intellectual Property (IP) cores and one or more target IP cores coupled to the interconnect, may include a power manager having a hierarchy of two or more layers including a hardware logic portion to control a power consumption of two or more domains in the integrated circuit, where each layer of the power manager performs its own function; and where the power manager controls the power consumption of two or more domains without using a CPU IP core of the integrated circuit to execute power management instructions. The power manager may make decisions regarding the powering of a domain based in part on a system software power manager including the operating system but without relying on the external operating software to manage the transitions of components in an appropriate domain in the integrated circuit into and out of a desired power consuming mode.

As the communications through the power manager may be through hardware and software components, the power manager may include a communications protocol to handle these interactions. For example, the power manager may include an advanced communication protocol between the power manager and two or more domains configured to communicate information between the power manager and a select domain it manages, wherein the advanced communication protocol is bidirectional and includes power related information from the domain to the power manager and power related commands from the power manager to the select domain, and the power related information includes the state and current activity of a selected domain.

The power manager may be used to encompass all of the communication needs between clock or power domains and the power manager. The power manager handles transitions between modes; manages inter-domains service dependencies; allows SOC activity observability; and provides a standard interface about clock request, voltage level, and operating modes. Tools assist SOC partitioning in domains of components that can allow their operating states and power consumption states to be grouped by how the IC will operate.

Embodiments of the power controller may be implemented in an interconnect. The system may include a configurable IP generator, and may support UPF (and CPF) for its configuration; with extensions for configurations of all these functions that goes beyond what these languages describe. The system may further include an optional GUI interface for configuration.

The IP generator may be used to generate (1) synthesis friendly logic, (2) extremely low power logic, aggressively using all the low power techniques available on a design, (3) code or microcode running on dedicated sequencer inside the power manager, (4) verification suites to validate the controller implementation at module level, and (5) chip-level test benches that can be reused by verification teams to validate their integration into the design, and/or (6) a software driver that provides functions to access, and program, all the power controller resources.

An exemplary IP generator to create a power manager includes an approach to break down the functionality of the IP into a set of "Functional Element" objects (FE objects). An FE object represents the resource required to perform some task, and the communication capabilities of the task with both the outside world (i.e. the SOC logic domains) and other FE objects in the power manager. An FE object can be seen as a small processing unit that executes a particular task or program, and is able to interact with others.

A Functional Element object can exist either in hardware or in software, and in the later case may be run-time programmable. The so called "software" objects will be the code running on the programmable processor that will be optionally used in the power manager. The term "object" is used by analogy to objects in the object oriented software world, where an object is an instance of a class.

As used herein the following object oriented terms and concepts, include:

Functional Element Class: the "base class" of all our objects present in the system. All objects are instances of classes that are sister classes of this base class. What it means is that, all these objects have the same kind of members and constructor, as defined below, but these members differs in number, name and type.

"XY Functional Element Class": a sister class of the Functional Element class, named XY. Objects of this class have all the same members (name and type), which are of the kind defined in the FE class. Objects in the power manager may be of this type.

XY object: an instance of the class XY. If the object is hardware, it represents the logic required to perform its functionality. If the object is software, it represents some assembly code and data structures in memory.

The Java language semantics of attributes such as "public", "private", "final" and "virtual" are also used herein.

Any derived class from an FE class shall have the following "kind of members":

Configurable interface members: A configurable interface is an object comprising an array of parameter values and a set of rules that defines what physical ports are present on the FE depending on the parameter values. There may be predefined configurable interface classes, like OCP, advanced system bundle, advanced power bundle (as defined below), and generic bit vector. The interface members define how the FE interacts with the SOC logic, they are at the interface between the power manager and the rest of the SOC. Interface members may not be used for communication between FEs. Interface members are optional and may not exist for the FEs that only communicate with other FEs in the power manager. Interface members may also be private only, which means they can be accessed only by the object they belongs to.

Data members: These members store the object state. Data members can be private or public, with separate control over read and write operations. For instance, a data member can be made private in write but public in read. Other FEs can access public data members of an object.

Methods: Methods are intended to expose the object functionality to other FEs. A method can be private, in which case it can only be called by the object itself, from within other methods or the "execution engine," as described below. A method can be public in which case it can be called by any other FE in the system. A method can be virtual, in which case an implementation might be provided by the user at instantiation time. Methods may not access configurable interface members, only data members.

Constructor and "execution engine": Like any object, a constructor represents what the object will be (statically) made of when it is created. The constructor describes the object's permanent functionality, it can be compared to the description of the task performed by the small "execution engine" that the FE represents. The execution engine described in the constructor may be the only one allowed to access configurable interface members; it may also freely access all data members. In essence, it may abstract the code that implements the FE behavior, this code can be RTL or assembly language depending on where the FE lives (hardware or software).

In fact the present description may be closer to a class template, as in C++, than to a class. The methodology described herein has been used to describe a system behavior and not necessarily a language. As such, the capabilities of the objects may have been limited to what is required to specify their behavior in the system and how they communicate with each other. For illustration, plain English is used instead of defining a syntax to define a Functional Element Class and describe its members.

As illustrated in FIG. 10, the different functions may be performed by hardware/software or a combination of both. Also the different hardware/software functions may provide different levels of configurability at different times during the manufacture and use of the resulting electronic device utilizing the power manager. For example, elements labeled 1010 may be hardware functions including a purely static configuration; elements 1012 may be hardware elements with register configurability, elements 1014 may be programmable hardware executing software FEs, while 1016 are software functions on the host processor.

The execution engine defined in the constructor can use instantiation of other FE objects, so the description is hierarchical in nature.

Private methods can be called only by the FE execution engine. They are intended to be used as entry points for communication initiated by the FE. Virtual, private methods are simple "hooks" allowing the user to specify actions when these methods are called by the implementation.

Public methods can be called by other FE objects, and are intended to be used for communication initiated by other FE objects. A public method can be called by multiple FE objects at the same "time", and it may be the job of the (hidden) inter-FE communication network to serialize all the calls. It is believed that this communication architecture between FE objects fits well with the asynchronous nature of communication within the power manager IP; no assumptions are made about the clock domains the different objects lives in. A FE object is made aware that a method it is calling has been executed by receiving a return value, if any. If a method does not return a value then it is assumed that it is OK for the caller to ignore when the call will actually take place and produces its result.

Object instantiation can be seen as the user action of selecting a FE to be included in the power manager IP to take advantage of its provided functionality. In the power manager configuration methodology, there may be four main steps. The steps, as described below, are illustrative and may be combined, subdivided, or reorganized.

First, a basic set of FE objects may be instantiated as the result of the description to the tool of the power domains. These objects may be selected based upon static information about the power and clock domains. These FE objects implement the controller basic functionality, i.e. low-level interaction with the hardware.

Next, the user may be able to select a library of pre-defined, hardware FE classes to implement more complex behaviors. These objects represent permanent functionality, which will be present in the power manager logic. Typically, objects capable of generating events like timers or edge detectors will be in this category.

Then, the user may be able to define software FE classes, which will run on the programmable engine of the power manager. These objects can be made permanents (their code will be stored in ROM) or run-time (their code lives in RAM). These high-level objects may be used to implement functions that either is not doable with the set of pre-defined hardware FE classes, or that needs to be changed at run-time, or both.

Finally, the user may "connect" all the objects to achieve the desired functionality, by providing an implementation for the corresponding method where needed; and for the software classes, by providing the constructor or "execution engine" software implementation.

By using this approach, the details of the communication hardware required between our functional element objects are completely hidden, exposing only the communication intent. It may be the job of the IP generator to go from this view to a hardware implementation. It is understood that for this approach to be useable, there may be a way for the user to weight communication costs, that is, to indicate to the tool which communications are time-critical and which ones are not.

Thus, a chip supplier may provide tools including a library of verified FE classes, and/or the tool to build them, while the manufacturer utilizing the chip within an electronic device may instantiate and connect these objects together during the configuration process.

The power manager shall offer multiple ways to implement description, and execution, of power management policies; which may include observation of system state. Below is described a "toolbox" for implementing both of those functions:

Observation of system state 1002 may be supported through a set of "events and condition generation" functions. Because changes of system state can be linked to occurrence of events like timers alarms or IO pins changes, the power manager may be able to detect events and remember them; and even to generate them when required. Using events as trigger, a policy execution engine may also be able to access all the meaningful information defining the system state, which imply combining input values (pins, registers, . . . ); therefore the power manager may offer all the tools required to access these information and encode them. The "toolbox" approach does not impose on the user any particular requirements in term of system state handling: part may be handled in software, like operating system and device drivers states, and communicated to the power manager through registers; part may be in hardware, like activity monitors and watchdogs timers, and communicated to the power manager through hardware ports.

Description and Execution of power management policies 1004. Policy description may be supported by a hierarchical mode table system, which is very flexible in terms of operating point description capabilities. Policy execution may be supported by a set of functions allowing execution to be done completely in software, completely in hardware, or as a mix of the two approaches.

The last functions in FIG. 10, labeled "Microcoded functions" 1006 may provide the highest level of intelligence and flexibility to the power manager. The microcoded functions may be based on a programmable engine. The programmable engine may be able to execute user programs, with minimal power consumption and maximum efficiency. The type of program that is intended to be run on this engine is control-oriented, state machine execution, with efficient evaluation of state transitions conditions. It may be able to handle efficiently multiple, independent programs in a multi-threaded fashion, each thread describing a particular state machine. The programmable engine will have its own, private program and data memory space (its own RAM and ROMs accessible by it only). The programmable engine may have control to, and visibility from, the other functions of the power manager. The programmable engine may be able to provide conditions and events, and read conditions and events; it may be able to access power manager registers that allows control of analog functions; it shall be able to access individual clock and power domains status; it may be able to send commands to clock and power domains.

Accordingly, the interconnect may include a programmable engine, including a dedicated memory space and computing logic, to execute multiple user programs through one or more state machines with minimal power consumption and maximum efficiency in a multi-threaded fashion, wherein each thread describes a particular state machine, and the programmable engine provides support for developing run-time modifiable functions and permit a user to specify complex power management behavior that does not require external software interaction of a CPU of the integrated circuit. The programmable engine may also monitor a particular power domain activity and include logic to automatically turn off power to the particular power domain and all domains that depend from it, if a given level of activity is reached and according to the current policy being executed.

The main use of the programmable engine is to provide support for developing run-time modifiable functions. The programmable engine may provide the way for the user to specify complex power manager behavior, which does not requires external software interaction, but needs the flexibility of being run-time programmable. For instance, it may be possible for the power manager to monitor a particular power domain activity (system state observation function), and to automatically decide to switch it off, along with all the domains that depend on it, if a given level of activity is reached, and according to the current policy being executed. Part of the power management policy may be implemented in the programmable engine. Another example, is the implementation of a DVFS algorithm that controls how the voltage and clock speed of a particular domain varies. The decision to change voltage and frequency itself is taken by the power manager policy, elsewhere, depending on the need of the tasks running on this domain.

The power manager hardware may offer flexible means to compute, store and process any kind of system information to build a hardware system state. At global level, the power manager may gather 10 states, sensor information, including temperature, monitored activity etc., dedicated timers value. At a domain level, the power manager hardware communicates with the power manager through the advanced power bundle.

In most applications it is expected that one or more CPUs will have to communicate with the power manager. The power manager shall provide the resources required by communications initiated by the CPU. More precisely, this need may be supported with two elements: a register bank module, and a register bank interface module.

The register bank module is defined as follows: It may have one configurable interface member, which is an OCP bundle. It may be from this interface that reads and writes to/from the registers of the bank from/to the outside world are done. It may have an array of registers. There may also be a way to specify how bit fields can be accessed—read/write (R/W), right only (RO), or write only (WO).

There may be a function WriteToRegisterBank(index, value) that is called each time a write operation is done on the OCP interface. By providing an implementation for this function, the user can specify an action to be taken each time a given register changes its value. Typical usage may be to call a function that is linked to this value. In one implementation, the function is private and virtual.

There may also be a function ReadFromRegisterBank(index) that is called each time a read operation is done on the OCP interface. By providing an implementation for this function, the user can specify an action to be taken each time a given register changes its value. Typical usage may be to call a function that is linked to this value like clearing a flag when a register is read. In one implementation, this function may be private and virtual.

In most applications it is expected that one or more CPUs will have to communicate with the power manager. The power manager shall provide the resources required by communication initiated by the power manager. Such modules may have a FIFO queue into which other power manager functions may be able to push an interrupt ID in the form of an integer. As soon as the FIFO is non empty, an interrupt signal is asserted by the module. Reading the FIFO from an OCP interface will pop the oldest entry and return its value as the result of the read.

The description associated with the power manager functions overview of FIG. 10, as well as the detailed description associated with the other figures included herein, is intended as illustrative only and describes only an exemplary embodiment. Accordingly, a person of skill in the art will recognize that the described modules, functions, methods, routines, algorithms, objects, classes, configurations of registers, hardware, and software may be altered and remain within the scope of the present invention.

Figure 11:
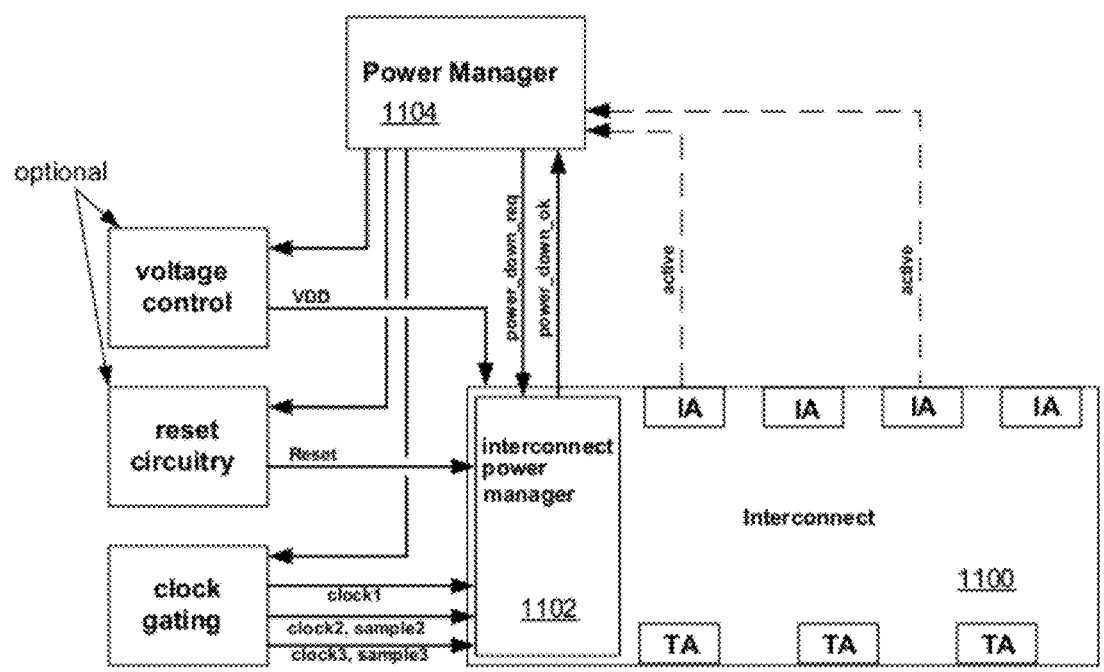
FIG. 11 illustrates an exemplary hardware diagram representing the power functions as described above.

FIG. 11 illustrates an exemplary hardware diagram representing the power functions as described above. An interconnect 1100 may include a power manager as described herein. The power manager may be implemented in a combination of hardware and software, and may modify voltage and clock signals to manage the power consumption of the device.

A method for an integrated circuit to manage power consumption on the integrated circuit may include communicating transactions between one or more initiator Intellectual Property (IP) cores and one or more target IP cores coupled to a bus type interconnect. The power consumption in the integrated circuit may be controlled with a power manager having a hierarchy of two or more layers including a hardware logic portion 1102 located on the interconnect 1100 that controls a power consumption of two or more domains in the integrated circuit, where each layer of the power manager performs its own function. The power consumption of two or more domains may be controlled with the power manager 1104 and without using a CPU IP core of the integrated circuit to execute power management instructions from the power manager to control the power consumption of the two or more domains.

The power manager may have one or more software visible registers, tables, or any combination of both that are programmable, so that its behavior can be changed at run-time to support different chip operating modes. For example, the power manager may also include multiple power management policies stored in a table, register, matrix or some combination of the three that indicate which components can be transitioned into different power consuming modes during different chip modes and in relation to other applications running on the integrated circuit at that time. The multiple power management policies can be programmed and or updated by a chip designer at design time, run time, and as well as after fabrication during a lifetime of that integrated circuit.

A flexible protocol may be defined to support this communication using several wires including "power_down_req", "power_down_ok" and "active". As functional blocks will become more and more complex, the flexible protocol also can both carry more status information (like user-defined statistics on the block activity), support more power states than just on/off, and allow power manager request to be qualified to support more complex behaviors.

There is a need for a higher level protocol that allows communication of information between the power manager and the logic in a domain it manages. This protocol deals with the power-related architectural features implemented inside the logic of the SOC and allows interaction between this logic and the power manager. By architectural features, we mean the logic functions implemented inside a design to explicitly support power management, like activity flags and activity state information, power_down_rq/power_down_ack handshakes, etc.

An exemplary protocol is defined here referred to as the "advanced power protocol." The power manager as described herein may support this protocol completely. This protocol is built in a configurable fashion, so it can be adapted to the wide range of power saving architectural support found in SOC IPs.

It is intended that this exemplary protocol act as an "abstraction layer," providing a well defined understanding of the different features to the power manager on one hand, and being easily bridged to the user specific implementation on the other hand. The user may insert "adapters" that include the needed gates to connect the power manager to its own logic. A support for the definition and insertion of such "adapters" between the power manager and the user logic shall be implemented in the power manager creation tools, as described above.

Low power techniques implemented by the power manager may include: DVFS, SOC partitioning in domains, voltage and clock sources control, transitions control. Gate-level and transistor-level low-power techniques implementation tools and EDA flows may also be used.

During the architecture definition phase of the SOC, its partitioning into clock and power domains may be driven mainly by application use cases and power consumption targets. Subsystems with greatly variable workload will benefit from dynamically adjustable voltage and clock sources (DVFS); CPU and DSP will be in this category for instance. Partitioning may be the joint responsibility of system architects, RTL designers, and implementation engineers.

The power manager also provides a programming model that nicely fits existing software standards requirement in this area, preferably with a strong focus on ACPI.

Figure 12:
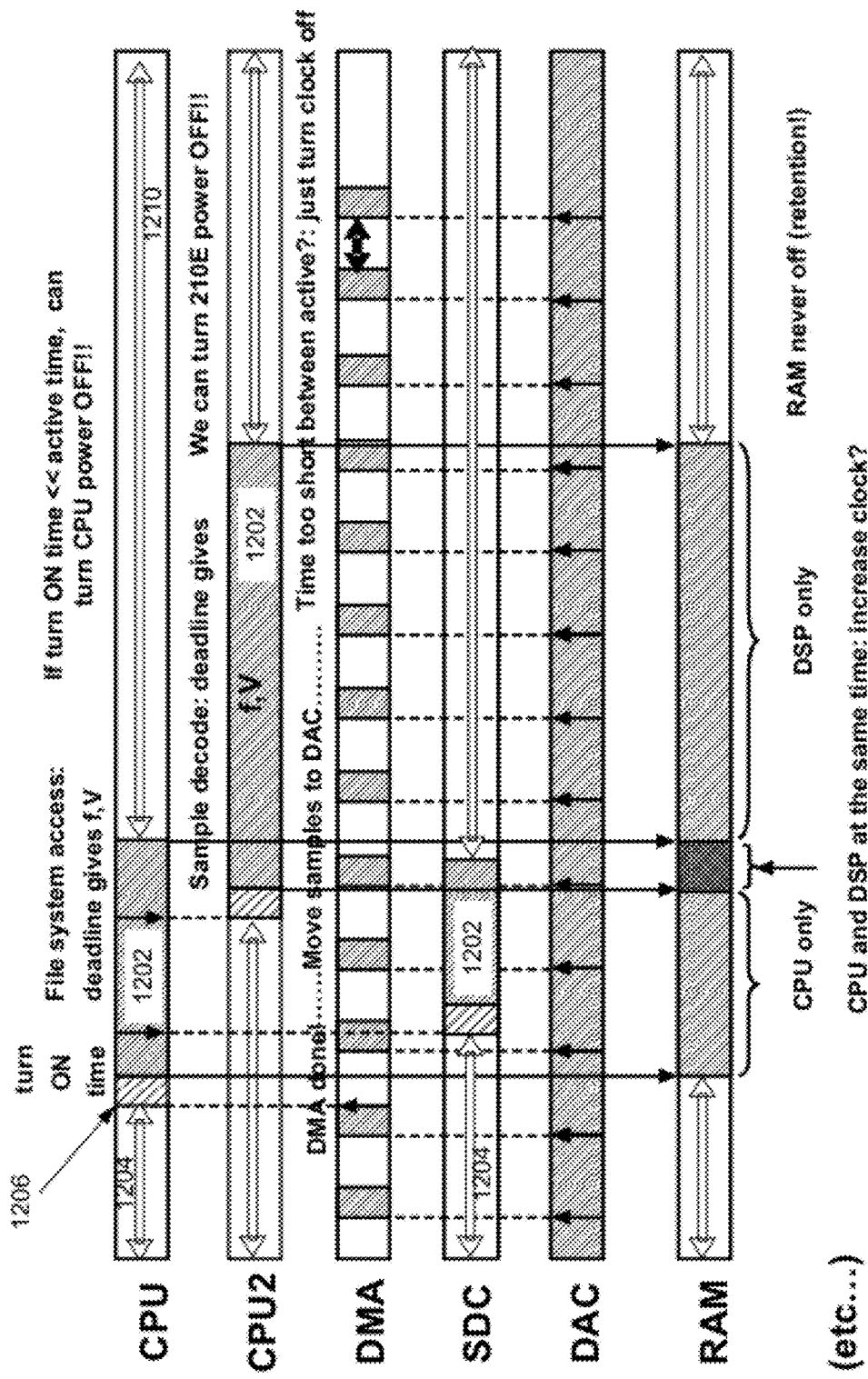
FIG. 12 illustrates an exemplary application timing profile of integrated circuit components used when an application is run and how it relates to operating power modes.

FIG. 12 illustrates an exemplary application timing profile of integrated circuit components used when an application is run. An application may run using various components including, for example, the CPU, CPU2, DMA, etc. While the application is running, these components may be active (1202) or may not be in use (1204). These components may also require power up time (1206) before they are active. When a component is not in use (1202), the power or clock states may be altered to conserve power.

A method for an integrated circuit to manage power consumption on the integrated circuit may include communicating transactions between one or more initiator Intellectual Property (IP) cores and one or more target IP cores coupled to a bus type interconnect. The method may further include controlling a power consumption in the integrated circuit with a power manager having a hierarchy of two or more layers including a hardware logic portion located on the interconnect that controls a power consumption of two or more domains in the integrated circuit, where each layer of the power manager performs its own function; and controlling the power consumption of two or more domains with the power manager and where the power manager resides underneath the Operation System of the integrated circuit in order to transition components in the power domains into a first power consuming mode and back out of the power consuming mode into a second power consuming mode.

Suite of tools coding may be used for assisting in determining the policies of who gets turned off during various activity and application running and mode of chip scenarios. Thus, an activity detector may sense and communicate what level of activity is occurring dynamically in its associated IP block/one or more components to the power management logic and then based on the sensed activity, the programmed in policy currently selected via the matrix of possible power management policies that factor in chip mode, applications running, amount of power saved for turning off components such as IP blocks to amount of time to restore the IP block from a power saving mode, and other factors, the power management logic may have that domain controller alter the power consumption of its associated IP block/one or more components. These decisions occur without the OS being needed to turn on and off the components. An input from the standard power savings software may be present as a factor to the hardware logic power manager. The policies may be stored in a matrix that allows for overlapping policies depending upon the mode of the chip. As the power manager is implemented outside of the OS, the response time to transition the associated component into the power saving mode is less than several tens of clock cycles and to transition the associated component back out of the power saving mode is less than one hundred of clock cycles.

In an exemplary application profile shown in FIG. 12, the CPU is not in use for a period of time, then powers on, and is active while it accesses other devices or executes the application software. The CPU is then idle again while other components are active. While the CPU is active, it can access RAM, which is also active, it then accesses the SDC, which is powered on and then active. The CPU then accesses CPU2, for example an ARC processor, which powers on and is active after the CPU is idle. The DAC is active continuously, while the DMA is active intermittently.

A power manager, according to embodiments, may be used to determine which components may save power through a change in power or clock state. The power manager may consider the power up and power down times, the current activity level of the component, the programmed in policy currently selected via the matrix of possible power management policies that factor in chip mode, applications running, amount of power saved for turning off components such as IP blocks to amount of time to restore the IP block from a power saving mode, and other factors, and the component characteristics to determine whether a component or blocks of components should be left active, powered down, or changed to an intermediate power saving state. The power manager may also change the clock cycle to conserve power, when a faster clock cycle is not required.

For example, during time 1210, the CPU may be powered down if the time to turn the CPU on is less than the anticipated inactive time given the current system applications, while CPU2 may be powered down after it has been used for the application. The power manager may consider the timing interval between when the DMA is active to determine that the interval is too short to permit a full power down. The power manager may then decide to simply turn the clock off during the inactive period. The Power Manager may also determine that the RAM is accessed by only a single component, for example by the CPU only or DSP only, which may permit a slower clock frequency at one or both of these times. However, during certain applications, RAM may be accessed by more than one component, such as both the CPU and DSP, at the same time. Therefore, the Power Manager may determine that a faster clock cycle desired at the expense of additional power consumption. While the RAM is not accessed, the Power Manager may decide to continue to maintain power for RAM data retention, but may use a slower clock cycle or other power saving state.

Figure 13:
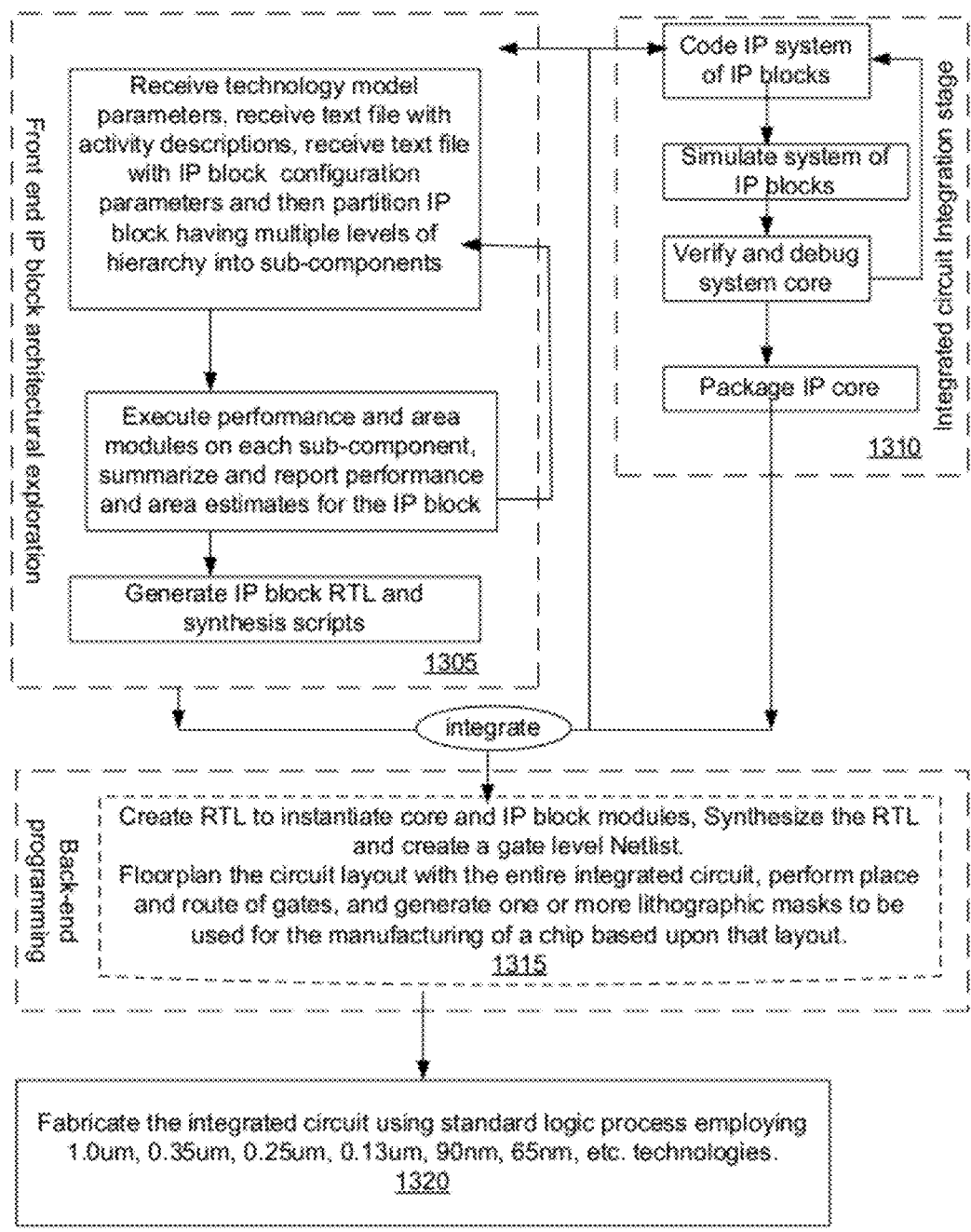
FIG. 13 illustrates a flow diagram of an embodiment of an example of a process for generating a device, such as a System on a Chip, in accordance with the systems and methods described herein.

FIG. 13 illustrates a flow diagram of an embodiment of an example of a process for generating a device, such as a System on a Chip, in accordance with the systems and methods described herein. The example process for generating a device with designs of the interconnect may utilize an electronic circuit design generator, such as a System on a Chip compiler, to form part of an Electronic Design Automation (EDA) toolset. Hardware logic, coded software, and a combination of both may be used to implement the following design process steps using an embodiment of the EDA toolset. The EDA toolset such may be a single tool or a compilation of two or more discrete tools. The information representing the apparatuses and/or methods for the circuitry in the Interconnect, Memory Scheduler, etc. may be contained in an Instance such as in a cell library, soft instructions in an electronic circuit design generator, or similar machine-readable storage medium storing this information. The information representing the apparatuses and/or methods stored on the machine-readable storage medium may be used in the process of creating the apparatuses, or model representations of the apparatuses such as simulations and lithographic masks, and/or methods described herein.

Aspects of the above design may be part of a software library containing a set of designs for components making up the scheduler and Interconnect and associated parts. The library cells are developed in accordance with industry standards. The library of files containing design elements may be a stand-alone program by itself as well as part of the EDA toolset.

The EDA toolset may be used for making a highly configurable, scalable SOC inter block communication system that integrally manages input and output data, control, debug and test flows, as well as other functions. In an embodiment, an example EDA toolset may comprise the following: a graphic user interface; a common set of processing elements; and a library of files containing design elements such as circuits, control logic, and cell arrays that define the EDA tool set. The EDA toolset may be one or more software programs comprised of multiple algorithms and designs for the purpose of generating a circuit design, testing the design, and/or placing the layout of the design in a space available on a target chip. The EDA toolset may include object code in a set of executable software programs. The set of application-specific algorithms and interfaces of the EDA toolset may be used by system integrated circuit (IC) integrators to rapidly create an individual IP core or an entire System of IP cores for a specific application. The EDA toolset provides timing diagrams, power and area aspects of each component and simulates with models coded to represent the components in order to run actual operation and configuration simulations. The EDA toolset may generate a Netlist and a layout targeted to fit in the space available on a target chip. The EDA toolset may also store the data representing the interconnect and logic circuitry on a machine-readable storage medium.

Generally, the EDA toolset is used in two major stages of SOC design: front-end processing 1305 and back-end programming 1315. The EDA toolset can include one or more of a RTL generator, logic synthesis scripts, a full verification testbench, and SystemC models.

In step 1305, the EDA tool set may receive a user-supplied text file having data describing configuration parameters and a design. The EDA tool set may also generate an RTL file of that IP block design for logic synthesis based on the user supplied configuration parameters and implementation technology parameters. As discussed, the RTL file may be a high-level hardware description describing electronic circuits with a collection of registers, Boolean equations, control logic such as "if-then-else" statements, and complex event sequences.

In step 1310, a separate design path in an ASIC or SOC chip design is called the integration stage. The integration of the system of IP blocks may occur in parallel with the generation of the RTL file of the IP block and synthesis scripts for that IP block.

The EDA toolset may provide designs of circuits and logic gates to simulate and verify the operation of the design works correctly.

In step, 1315, system integration may occur in the integrated circuit design process. Back-end programming generally includes programming of the physical layout of the SOC such as placing and routing, or floor planning, of the circuit elements on the chip layout, as well as the routing of all metal lines between components. The back-end files, such as a layout, physical Library Exchange Format (LEF), etc. are generated for layout and fabrication.

The generated device layout may be integrated with the rest of the layout for the chip. A logic synthesis tool receives synthesis scripts for the IP core and the RTL design file of the IP cores. The logic synthesis tool also receives characteristics of logic gates used in the design from a cell library. RTL code may be generated to instantiate the SOC containing the system of IP blocks. The system of IP blocks with the fixed RTL and synthesis scripts may be simulated and verified.

Synthesizing of the design with Register Transfer Level (RTL) may occur. The logic synthesis tool synthesizes the RTL design to create a gate level Netlist circuit design (i.e. a description of the individual transistors and logic gates making up all of the IP sub component blocks). The design may be outputted into a Netlist of one or more hardware design languages (HDL) such as Verilog, VHDL (Very-High-Speed Integrated Circuit Hardware Description Language) or SPICE (Simulation Program for Integrated Circuit Emphasis).

In step 1320, a fabrication facility may fabricate one or more chips with the signal generation circuit utilizing the lithographic masks generated from the EDA tool set's circuit design and layout. Fabrication facilities may use a standard CMOS logic process having minimum line widths such as 1.0 um, 0.50 um, 0.35 um, 0.25 um, 0.18 um, 0.13 um, 0.10 um, 90 nm, 65 nm or less, to fabricate the chips. The size of the CMOS logic process employed typically defines the smallest minimum lithographic dimension that can be fabricated on the chip using the lithographic masks, which in turn, determines minimum component size. According to one embodiment, light including X-rays and extreme ultraviolet radiation may pass through these lithographic masks onto the chip to transfer the circuit design and layout for the test circuit onto the chip itself.

As discussed, an EDA tool set may be implemented in software as a set of data and instructions, such as an instance in a software library callable to other programs or an EDA tool set consisting of an executable program with the software cell library in one program, stored on a machine-readable medium. A machine-readable storage medium may include any mechanism that stores information in a form readable by a machine (e.g., a computer). For example, a machine-readable medium may include, but is not limited to: read only memory (ROM); random access memory (RAM); magnetic disk storage media; optical storage media; flash memory devices; DVD's; EPROMs; EEPROMs; FLASH, magnetic or optical cards; or any other type of media suitable for storing electronic instructions. The instructions and operations also may be practiced in distributed computing environments where the machine-readable media is stored on and/or executed by more than one computer system. In addition, the information transferred between computer systems may either be pulled or pushed across the communication media connecting the computer systems.

Some portions of the detailed descriptions above are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like. These algorithms may be written in a number of different software programming languages such as C, C+, SystemC, Verilog, or other similar languages. Also, an algorithm may be implemented with lines of code in software, configured logic gates in software, or a combination of both.

In an embodiment, the logic consists of electronic circuits that follow the rules of Boolean Logic, software that contain patterns of instructions, or any combination of both. Various components described above may be implemented in hardware logic, software, or any combination of both.

While some specific embodiments of the invention have been shown the invention is not to be limited to these embodiments. For example, most functions performed by electronic hardware components may be duplicated by software emulation. Thus, a software program written to accomplish those same functions may emulate the functionality of the hardware components in input-output circuitry. The invention is to be understood as not limited by the specific embodiments described herein, but only by scope of the appended claims.

In one embodiment, the software used to facilitate the algorithm can be embodied onto a machine-readable medium. A machine-readable medium includes any mechanism that provides (e.g., stores and/or transmits) information in a form readable by a machine (e.g., a computer). For example, a machine-readable medium includes read only memory (ROM); random access memory (RAM); magnetic disk storage media; optical storage media; flash memory devices; Digital VideoDisc (DVD's), EPROMs, EEPROMs, FLASH memory, magnetic or optical cards, or any type of media suitable for storing electronic instructions. Accordingly, embodiments described herein include a machine-readable storage medium that stores instructions, which when executed by a machine causes the machine to generate model representations for the integrated circuit according to embodiments described herein, which are used in an Electronic Design Automation process.

Similarly, reference is made to classes, objects, routines, algorithms, modules, functions, methods, etc. to refer to common mechanisms and/or resources required to perform some task. These terms may identify the common mechanisms to code in software the functionality associated with the software component block. Accordingly, these terms may be used interchangeably to reference known techniques to implement the desired functions in software and/or hardware components. Accordingly, reference to these terms is not intended to limit the present disclosure to a specific software language, software implementation, software hierarchy, etc., but is merely an exemplary mechanism to conceptualize the described functions into named entities.

While some specific embodiments of the invention have been shown the invention is not to be limited to these embodiments. For example, most functions performed by electronic hardware components may be duplicated by software emulation. Thus, a software program written to accomplish those same functions may emulate the functionality of the hardware components in input-output circuitry. Also, the power manager is described herein to reside under or to cooperate with an operating system of an integrated circuit, it is understood that embodiments of the described power manager may be used with integrated circuits without an operation system. For example, the power manager may run on its own and be programmed at design time. Also, as described herein, the power manager in an exemplary embodiment is incorporated into or communicates with an interconnect for an integrated circuit. However, as appreciated by one of skill in the art, embodiments as described herein may be implemented in a system on a chip without an interconnect in which IP cores are connected point to point. The invention is to be understood as not limited by the specific embodiments described herein, but only by scope of the appended claims.

The use of the terms "will," "shall," "is" etc. are intended as mere descriptions of a preferred embodiment, and are not intended to limit the present invention as defined by the claims.

What is claimed is:

1. An interconnect for an integrated circuit to communicate transactions between one or more initiator Intellectual Property (IP) cores and one or more target IP cores coupled to the interconnect, comprising:
    a power manager having a hierarchy of two or more layers including a hardware logic portion to control a power consumption of two or more domains in the integrated circuit, where each layer of the power manager performs its own function;
    individual domain controllers, comprising hardware logic of the power manager, to transition components in an appropriate domain in the integrated circuit into and out of a desired power consuming mode, and cooperates with a software based power management component including an operating system;
    wherein the power manager has its own 1) dedicated CPU, 2) dedicated state machine or 3) any combination of the two to execute power management instructions;
    wherein the power manager controls the power consumption of two or more domains without using a CPU IP core utilized by other IP cores on the integrated circuit to execute the power management instructions; and
    wherein each domain controller is configured with conflict resolution logic on how to control the desired power consuming mode of its domain that includes a shared resource by the IP cores of the integrated circuit when one or more power management policies being implemented overlap to control the power consuming mode of the shared resource.

2. The interconnect of claim 1, wherein each domain of the two or more domains includes one or more components that share 1) voltage, 2) clock, or 3) both voltage and clock operating characteristics and operating states, and the power consumption of the two or more domains is controlled through advanced power management techniques comprising clock gating, clock scaling, voltage scaling, power gating, and any combination of these;
    wherein the power manager has the dedicated CPU and the dedicated CPU cooperates with an Operating System dedicated for the power manager; and
    wherein the power manager controls the power consumption of two or more domains without the Operating System that interacts with applications on the integrated circuit governing the rest of the CPU IP cores being utilized to transition the components in the power domains into a first power consuming mode and back out of the first power consuming mode into a second power consuming mode.

3. The interconnect of claim 1, wherein the individual domain controllers transition one or more components they are monitoring and controlling in the appropriate domain into the desired power consuming mode in generally less than 250 and preferably less than 50 clock cycles and transitions the appropriate domain out of the desired power consuming mode in generally less than 1000 and preferably less than 100 clock cycles.

4. The interconnect of claim 1, further comprising a set of one or more activity detector logic units for each domain controller, which feed dynamic signals of whether activity is occurring for one or more components in that domain, wherein the activity detector monitors a communication interface into that domain to see if activity is occurring at each cycle.

5. The interconnect of claim 1, further comprising an advanced communication protocol between the power manager and two or more domains configured to communicate information between the power manager and a select domain it manages, wherein the advanced communication protocol is bidirectional and includes power related information from the select domain to the power manager and power related commands from the power manager to the select domain, and the power related information includes a state and current activity of the selected domain, where domain logic controllers are configured to detect and manage conflicts between the power related commands from the power manager to the select domain and the power related information indicating current activity of the select domain.

6. The interconnect of claim 1, further comprising one or more activity detectors to detect activity from a particular power domain, where the activity detector is configured to sense and communicate an activity level in the particular power domain, including an IP core, to an upper layer of the power manager, and the upper layer of the power manager includes logic to alter a power consumption state of the particular power domain according to the activity level, a transition time to transition the particular domain into and out of the particular power consumption state, and based on a current power management policy being executed, wherein an amount of domains on the integrated circuit is a configurable parameter set by a chip designer at run time fabrication of the integrated circuit, and each domain has its own domain logic controller as well as a first activity detector, an amount of hardware instantiated required for a given design is scalable to the configurable parameter set by the chip designer.

7. The interconnect of claim 1, wherein the power manager has logic configured to make decisions regarding powering of a particular domain based in part on the software based power management component including an operating system but without relying on an external operating software to manage the transitions of the components in an appropriate domain in the integrated circuit into and out of a desired power consuming mode, and wherein the power manager has one or more software visible registers, tables, or any combination of both that are programmable, so that its behavior can be changed at run-time to support different chip operating modes.

8. The interconnect of claim 1, wherein the power manager further includes multiple power management policies stored in a table, register, matrix or some combination of the three that indicate which components can be transitioned into different power consuming modes during different chip modes and in relation to other applications running on the integrated circuit at that time, wherein the multiple power management policies can be programmed and or updated by a chip designer at design time, run time, and as well as after fabrication during a lifetime of that integrated circuit.

9. The interconnect of claim 1, further comprising a programmable engine, including a dedicated memory space and computing logic, to execute multiple user programs through one or more state machines in a multi-threaded fashion, wherein each thread describes a particular state machine, and the programmable engine provides support for developing run-time modifiable functions by permitting a user to specify complex power management behavior that does not require external software interaction of the CPU IP core utilized by the other IP cores on the integrated circuit, wherein the programmable engine monitors a particular power domain activity and includes logic to automatically turn off power to the particular power domain and all domains that depend from it, if a given level of activity is reached and according to a current power management policy being executed.

10. The interconnect of claim 1, wherein the hierarchy of the power manager includes at least three layers, each with a separate mission, wherein a top level of the hierarchy includes a policy manager, an intermediate level includes two or more power management policies in which the policy manager selects a current power management policy to implement, and a low level comprising operating points that map a desired operating state of a particular domain to operational voltage and clock frequency values for that particular domain, where a lower hierarchical level including domain controllers to receive the operation point and transition components in that domain into and out of a desired power consuming mode based on an activity occurring or anticipated to occur in that domain and guidance from the current power management policy being implemented.

11. The interconnect of claim 1, wherein the hierarchy of the power manager includes at least three layers, each with a separate mission, wherein a top level of the hierarchy includes a policy manager, an intermediate level includes two or more power management policies in which the policy manager selects a current power management policy to implement, and a low level comprising operating points that map a desired operating state of a domain to operational voltage and clock frequency values for that domain, and wherein domain controllers for the domain enforce inter-domain dependencies including controlling transition sequences.

12. The interconnect of claim 1, wherein the hierarchy of the power manager includes at least three layers, wherein a top level of the hierarchy includes a policy manager, an intermediate level includes four or more power management policies in which the policy manager selects a current power management policy to implement, and a low level comprising operating points that map a desired operating state of a domain to operational voltage and clock frequency values for that domain, and wherein domain controllers for the domain include one or more activity detectors to determine a current activity level of one or more components of a selected domain, and wherein each domain controller of the power manager further includes power conflict resolution logic to detect and manage conflicts between the power manger policy and the activity occurring in that domain, including an IP core being supplied by the activity detector.

13. The interconnect of claim 1, wherein the hierarchy of the power manager includes a low level having operating points that map a desired operating state of a domain to operational voltage and clock frequency values for that domain, where an operating state hardware is configured to implement various operating points and locally transition a given domain into and out of a current power consuming mode consisting of asynchronous clock sources, clock division, clock mux, hardware clock gate, power diverter, signal diverter, power splitter, controllable power regulators, signal splitter, finite state machines, clock, phase lock loops, or any combination of these, in which a selection of a new operating point expressing an intended power state of the given domain given a particular system state and under a given power management policy will automatically transition the given domain to the intended power state by supplying the operation voltage and clock frequency value as determined by the new operating point and controlled by one or more hardware components.

14. The interconnect of claim 1, wherein the hierarchy of the power manager includes a low level having operating points that map a desired operating state of a domain to operational voltage and clock frequency values for that domain, where the operating points are named data structures expressing an intended power state of the domain given a particular system state and under a given power management policy stored in software visible registers, tables, or any combination of both, and the power manager hierarchy further includes a low level hierarchical level including domain controllers to receive software functions in response to a selected operating point and using hardware logic to transition clock and power control values of each domain that result from a change in the selected operating point.

15. The interconnect of claim 1, wherein the hierarchy of the power manager includes an intermediate level that has two or more power management policies in which the policy manager selects a power management policy to implement, where the power management policies are stored in a table, hierarchical table, register, matrix or some combination of the three that map different system operating states to different operating points to improve energy savings for a given power management policy, wherein the table, the register, the matrix are programmable, so that its behavior can be changed at run-time to support different chip operating modes so that the power management policies can be programmed and or updated by a chip designer at design time, run time, or after fabrication and by a user during operation.

16. The interconnect of claim 1, wherein the hierarchy of the power manager includes an intermediate level that has two or more power management policies in which the policy manager selects a current power management policy to implement, where the power management policies are static descriptions of a mapping between a system state and an operating point, and the operating point is the static description of control values for clock and power distribution networks given a current power management policy, and the power manager further includes a policy execution engine to execute the power management policy, and a first domain controller to execute the operating point so that the domain controller transitions a selected domain from its current state to a new state as indicated by the operating point mapped from the power management policy executed by the policy execution engine.

17. The interconnect of claim 1, wherein the power manager includes groups of domains representing a first level of operating point specification, in which the groups of domains are hierarchically combined into supergroups that follow a hierarchical organization of the integrated circuit, and the power manager includes a hierarchy of controllers, wherein a local state is made visible to the power manager through a first domain controller, and a system state is made visible to the power manager through hardware and software tools, to transition the groups of domains into and out of desired operating states.

18. A non-transitory machine-readable storage medium that stores instructions, which when executed by a machine causes the machine to generate model representations for the integrated circuit of claim 1, which are used in an Electronic Design Automation process.

19. An interconnect for an integrated circuit to communicate transactions between one or more initiator Intellectual Property (IP) cores and one or more target IP cores coupled to the interconnect, comprising:
a power manager having a hierarchy of at least three layers including a hardware logic portion to control a power consumption of two or more domains in the integrated circuit, each layer having a separate mission, wherein a to level of the hierarchy includes a policy manager, an intermediate level includes two or more power management policies in which the policy manager selects a current power management policy to implement, and a low level comprising operating points that map a desired operating state of a domain to operational voltage and clock frequency values for that domain, where a lower hierarchical level including domain controllers is configured to receive the operation point and transition components in that domain into and out of a desired power consuming mode based on an activity occurring or anticipated to occur in that domain and guidance from a current power management policy being implemented;
wherein the power manager is configured to control the power consumption of two or more domains and resides underneath an Operation System of the integrated circuit in order to transition components in the power domains into a first power consuming mode and back out of the power consuming mode into a second power consuming mode.

20. A method for an integrated circuit to manage power consumption on the integrated circuit, comprising:
communicating transactions between one or more initiator Intellectual Property (IP) cores and one or more target IP cores coupled to a bus type interconnect, comprising:
controlling a power consumption in the integrated circuit with a power manager having a hierarchy of two or more layers including a hardware logic portion located on the interconnect that controls the power consumption of two or more domains in the integrated circuit, where each layer of the power manager performs its own function;
controlling the power consumption of two or more domains with the power manager and without using a CPU IP core of the integrated circuit to execute power management instructions from the power manager to control the power consumption of the two or more domains;
transitioning components in an appropriate domain in the integrated circuit into and out of a desired power consuming mode with individual domain controllers, comprising hardware logic of the power manager, and cooperating with a software based power management component including an operating system; and
controlling the power consumption mode of a first domain that includes a shared resource by the IP cores of the integrated circuit with a domain controller that is configured with conflict resolution logic on how to control the power consuming mode of its domain when one or more power management policies being implemented overlap to control the power consumption mode of the shared resource.

21. A method for an integrated circuit to manage power consumption on the integrated circuit, comprising:
communicating transactions between one or more initiator Intellectual Property (IP) cores and one or more target IP cores coupled to a bus type interconnect, comprising:
controlling a power consumption in the integrated circuit with a power manager having a hierarchy of two or more layers including a hardware logic portion located on the interconnect that controls the power consumption of two or more domains in the integrated circuit, where each layer of the power manager performs its own function;

controlling the power consumption of two or more domains with the power manager and where the power manager resides underneath an Operation System of the integrated circuit in order to transition components in the power domains into a first power consuming mode and back out of the first power consuming mode into a second power consuming mode; and executing multiple user programs through one or more state machines in a multi-threaded fashion, wherein each thread describes a particular state machine, and a programmable engine, including a dedicated memory space and computing logic, provides support for developing run-time modifiable functions by permitting a user to specify complex power management behavior that does not require external software interaction of a CPU of the integrated circuit, wherein the programmable engine monitors a particular power domain activity and includes logic to automatically turn off power to the particular power domain and all domains that depend from it, if a given level of activity is reached and according to a current policy being executed.

\* \* \* \* \*